United States Patent
Gassner et al.

(10) Patent No.: US 6,556,345 B1
(45) Date of Patent: Apr. 29, 2003

(54) OPTICAL NETWORK EQUIPMENT WITH CONTROL AND DATA PATHS

(75) Inventors: Michael J. Gassner, San Jose, CA (US); Lechuan Xue, Mountain View, CA (US); Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/917,664

(22) Filed: Jul. 31, 2001

Related U.S. Application Data

(60) Provisional application No. 60/299,442, filed on Jun. 21, 2001.

(51) Int. Cl.[7] .......................... H01S 3/13; H04B 10/02; H04B 10/12
(52) U.S. Cl. ............... 359/341.4; 359/337.11; 359/177; 372/29.01
(58) Field of Search .................. 359/341.4, 341.41, 359/341.42, 337.11, 177; 700/2, 4, 37; 372/29.01, 29.011, 29.014, 29.015

(56) References Cited

U.S. PATENT DOCUMENTS

| | | | |
|---|---|---|---|
| 4,968,977 A | * 11/1990 | Chinnaswamy et al. | 340/2.24 |
| 5,673,280 A | 9/1997 | Grubb et al. | 372/3 |
| 5,859,938 A | 1/1999 | Nabeyama et al. | 385/24 |
| 5,900,969 A | 5/1999 | Srivastava et al. | 359/341 |
| 5,940,209 A | * 8/1999 | Nguyen | 359/124 |
| 6,049,413 A | 4/2000 | Taylor et al. | 359/337 |
| 6,061,171 A | * 5/2000 | Taylor et al. | 359/337 |
| 6,081,366 A | 6/2000 | Kidorf et al. | 359/341 |
| 6,094,298 A | 7/2000 | Luo et al. | 359/346 |
| 6,115,174 A | 9/2000 | Grubb et al. | 359/334 |
| 6,134,047 A | 10/2000 | Flood et al. | 359/341 |
| 6,178,037 B1 | * 1/2001 | Sugaya et al. | 359/341.3 |
| 6,178,038 B1 | 1/2001 | Taylor et al. | 359/341 |
| 6,198,572 B1 | 3/2001 | Sugaya et al. | 359/337 |
| 6,215,581 B1 | 4/2001 | Yadlowsky | 359/337 |
| 6,246,510 B1 | * 6/2001 | BuAbbud et al. | 359/337 |
| 6,335,823 B2 | * 1/2002 | Ohshima et al. | 356/73.1 |
| 2001/0040720 A1 | * 11/2001 | Gerrish et al. | 359/341.4 |
| 2001/0050802 A1 | * 12/2001 | Namiki et al. | 359/337.11 |
| 2002/0093729 A1 | * 7/2002 | Gerish et al. | 359/341.41 |

FOREIGN PATENT DOCUMENTS

| | | |
|---|---|---|
| WO | WO 00/14909 | 3/2000 |
| WO | WO 00/49721 | 8/2000 |

OTHER PUBLICATIONS

Agere Systems Data Sheet Optical Amplifier Platform, 1724–Type Erbium–Doped Fiber Amplifier (S and V Series), Jul. 1999.*

Fitel Technologies, Inc. Data Sheet "Fully Digitized MPU Controlled EDFA, ERFA 3300 Series." Feb. 2000.*

"Cisco ONS 15216 EDFA1 Operations Guide" Apr. 2001.*

Sun et al. "Optical Fiber Amplifiers for WDM Optical Networks" Bell Labs Journal, p. 187–206, Jan.–Mar., 1999.

(List continued on next page.)

*Primary Examiner*—Thomas G. Black
*Assistant Examiner*—Andrew R Sommer
(74) *Attorney, Agent, or Firm*—Fish & Neave; G. Victor Treyz

(57) ABSTRACT

Optical amplifiers and other optical network equipment are provided for use in fiber-optic communications networks. The equipment may include dynamic spectral filters and optical channel monitors. Control units may be used to control the operation of the equipment. Components in the equipment may be interconnected using communications paths. The communications paths may include paths such as synchronous and asynchronous paths, point-to-point and multidrop paths, RS-232 paths, two-wire interface bus paths, parallel bus paths, and synchronous serial interface paths. The communications paths may be used to support an extensible equipment architecture that allows equipment features to be changed and added.

10 Claims, 21 Drawing Sheets

OTHER PUBLICATIONS

Sun et al. "Ultra Wide Band Erbium–Doped Fiber Amplifier with 80nm of Bandwidth" OSA Trends on Optics and Photonics, vol. 16 1997.

Ono et al. "Automatic Gain Control in Silica–Based EDFA with over 50nm Flat Gain Bandwidth using an all Optical Feedback Loop" $10^{th}$ Optical Amplifiers and their Applications Technical Digest, pp. 80–83, Jun. 9–11, 1999.

Takeda et al. "Active Gain Tilt Equalization by Preferentially 1.43$\mu$m–or 1.48$\mu$m–Pumped Raman Amplification" OSA Optical Amplifiers and their Applications, vol. 30, p. 101–105 (1999).

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

OPTICAL NETWORK EQUIPMENT WITH CONTROL AND DATA PATHS

This application claims the benefit of provisional patent application No. 60/299,442, filed Jun. 21, 2001.

BACKGROUND OF THE INVENTION

The present invention relates to fiber-optic communications networks, and more particularly, to optical network equipment such as optical amplifiers that have control and data paths.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

It is an object of the present invention to provide optical network equipment such as optical amplifiers that have control and data paths.

It is also an object of the present invention to provide optical network equipment such as optical amplifiers that have control buses and data buses for interfacing with components in the equipment.

SUMMARY OF THE INVENTION

These and other objects of the invention are accomplished in accordance with the present invention by providing optical amplifiers and other optical network equipment for use in fiber-optic communications links in fiber-optic networks. The fiber-optic links may be used to carry optical data signals associated with wavelength-division-multiplexing channels.

The equipment may include various optical components such as optical gain stages for providing optical gain for the optical signals, variable optical attenuators, dynamic spectral-filters, add/drop multiplexer components, optical channel monitors, dispersion-compensating elements, temperature controllers and sensors, photodetectors, and optical switches. A control unit may be used to control the operation of the equipment. The control unit may be based on processors, programmable logic devices, and other circuitry.

Circuit boards and other structures may be used to support the control unit circuitry and the components. Communications paths between the control unit circuitry and the components may be used to support communications between the control unit and the components. The communications paths may be paths that support serial communications or parallel communications. Synchronous and asynchronous communications may be supported. Multidrop buses and point-to-point paths may be used. Multiple components may share a bus using time-division-multiplexing arrangements. The use of these different communications arrangements may facilitate the process by which optical network equipment may be modified and expanded by adding components or modules.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
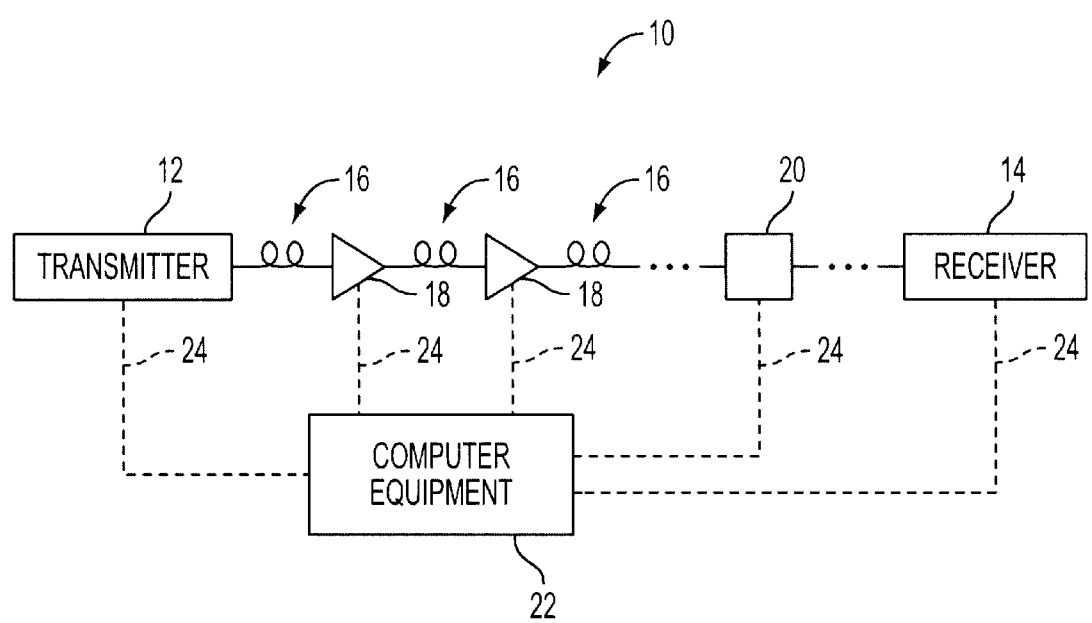
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of optical network equipment 20 having gain stages such as optical amplifiers 18. This is, however, merely illustrative. The features of the present invention may be used with any suitable optical network equipment if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

If amplifiers 18 or other equipment in link 10 have spectral adjustment capabilities, computer equipment 22 may use the gathered spectral information to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments. The spectral adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

Spectral adjustments may be made in the output power of transmitter 12 by adjusting a dynamic filter or variable optical attenuators in transmitter 12 to control the output powers of the channels in transmitter 12. Transmitter spectral adjustments may also be made by adjusting the strengths of the drive currents used to drive transmitter laser sources in transmitter 12. Spectral adjustments may be made in the input power for receiver 14 by adjusting a dynamic filter or variable optical attenuators before the received signals are processed by the detectors in receiver 14.

Spectral adjustments in equipment 20 and amplifiers 18 may be made using dynamic filter arrangements, individual variable optical attenuators, variable optical attenuator arrays, gain stage adjustments, or any other suitable spectral adjustment arrangements.

Figure 2:
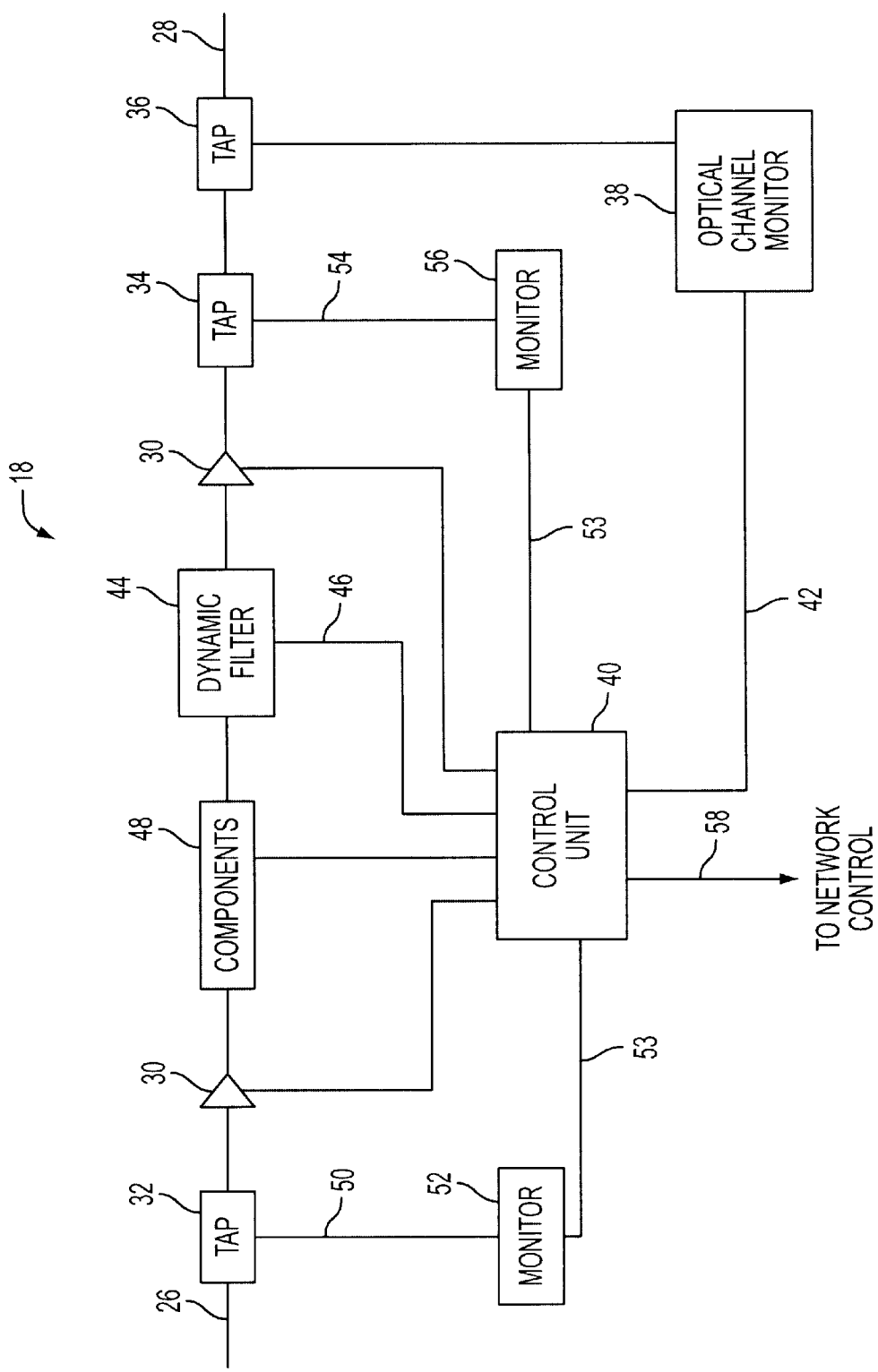
FIG. 2 is a schematic diagram of an illustrative optical amplifier in accordance with the present invention.

An illustrative amplifier 18 is shown in FIG. 2. Optical signals from a span of fiber 16 may be provided to input fiber 26. Corresponding amplified output signals may be provided at output fiber 28. Optical gain may be provided by one or more gain stages such as gain stages 30. Gain stages 30 may include, for example, one or more coils of optically-pumped rare-earth-doped fiber such as erbium-doped fiber. Pumps such as laser diode pumps or other suitable sources of pump light may be used to optically pump the erbium-doped fiber in stages 30.

Taps such as taps 32, 34, and 36 may be used to tap optical signals traveling along the main fiber path through amplifier 18. Taps 32, 34, and 36 may be any suitable optical taps such as 2%/98% wavelength-insensitive taps.

Tapped light from the fiber at output 28 may be provided to optical channel monitor 38. Optical channel monitor 38 may analyze this light to determine the optical spectrum of the output from amplifier 18. In the arrangement of FIG. 2, optical channel monitor 38 may be used to measure the output power spectrum of amplifier 18. The gain spectrum of amplifier 18 may be measured on a channel-by-channel basis by using optical channel monitor 38 to measure tapped input light from input 26. The gain spectrum may be determined by dividing the measured input power spectrum into the measured output power spectrum. If desired, an optical switch may be used to allow a single optical channel monitor such as monitor 38 to measure both input and output power spectra.

Any suitable arrangement may be used for monitor 38. For example, monitor 38 may have a dispersive element (e.g., a prism, grating, thin-film device, arrayed waveguide device, etc.) and an optical detector array (e.g., a charge-coupled device (CCD) array or a photodiode array). If desired, more than one dispersive element may be used. Fabry-Perot etalons or other optical filters having variable optical lengths may also be used to measure the optical spectrum of the tapped light in amplifier 18. These are merely illustrative examples. Any suitable optical monitoring arrangement may be used if desired.

Spectral information that is gathered by optical channel monitor 38 may be provided to control unit 40 over path 42 (e.g., using serial digital communications). Control unit 40 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Control unit 40 may be coupled to dynamic filter 44 using path 46. This allows control unit 40 to control the operation of dynamic filter 44 to adjust the spectrum of amplifier 18. Dynamic filter 44 may be formed using any suitable filter arrangement capable of producing a desired controllable loss (or gain) spectrum. Suitable filters may be based on micro-electro-mechanical systems (MEMS) devices, may be based on fiber-based devices (e.g., fiber Bragg grating devices), may be based on acoustooptic devices (e.g., acoustooptic fiber devices), may be based on thermo-optic arrayed waveguide devices, may be based on liquid crystals, may use electrooptic devices, may be based on semiconductor devices, or may be based on any other suitable dynamic filter arrangement.

Filter 44 may operate in transmission, as shown in FIG. 2, or may operate in reflection (e.g., using a circulator). A transmissive filter 44 may be based on a reflective filter element and a circulator that is used to couple light into and out of filter 44. If desired, filter 44 may use coupling arrangements such as arrangements based on lenses to couple light between the main fiber path in amplifier 18 and filter 44. Dynamic filter 44 may be controlled by control unit 40 over path 46 (e.g., a serial digital path).

If desired, additional components 48 may be provided in amplifier 18, such as additional taps for optical monitoring, filters, wavelength-division-multiplexing couplers, circulators, isolators, attenuators (e.g., variable optical attenuators), active or passive dispersion-compensating elements, optical switches, gain elements, or any other suitable components. These components may be located at any suitable location in the fiber path between input 26 and output 28.

Dynamic filter 44 may also be located in any suitable portion of amplifier 18. For example, filter 44 may be located at output 28, between gain stages 30 as shown in FIG. 2, at input 26, or at any other suitable location within amplifier 18. An advantage of locating dynamic spectral filter 44 between stages 30 as shown in FIG. 2, is that this may minimize noise.

If desired, dynamic filter 44 may be placed in series with another filter such as a static spectral filter. This may help to reduce the dynamic range required for dynamic filter 44. A static filter may be based on fiber gratings (e.g., fiber Bragg gratings), thin film filters, or any other suitable filters.

The total input power to amplifier 18 may be monitored using tap 32. Tapped signals from input 26 may be provided to fiber 50 by tap 32. Optical monitor 52 may measure the power of the signals provided over fiber 50 from tap 32. Tap 34, fiber 54, and optical monitor 56 may be used to measure the total output power of amplifier 18. Control unit 40 may determine the average gain of amplifier 18 in real time by calculating the ratio of the measured total output power to the measured total input power. The paths 53 between monitors 52 and 56 and control unit 40 may use a shared parallel bus or other suitable arrangement.

Control unit 40 may communicate with a network management system or other external computer equipment over path 58. Control unit 40 and path 58 may support any suitable communications protocols. For example, control unit 40 and path 58 may be used to support Ethernet protocols or RS-232 protocols.

The network management system may be implemented on computers at network nodes such as the nodes at which transmitter 12 and receiver 14 are located and at network management facilities or other suitable network locations. The network management system may gather information from amplifier 18 such as information on the current output power spectrum that is measured using optical channel monitor 38.

The network management system may be used to send commands to amplifier 18 and other equipment in the network. As an example, the network management system may send commands to amplifier 18 that direct amplifier 18 to establish and maintain a particular average gain setting or a particular spectral shape. Commands may be sent to amplifier 18 that place amplifier 18 in different operating modes. For example, amplifier 18 may be placed in a constant gain mode in which the gain of amplifier 18 is automatically held at a constant level, a constant output power mode in which the total output power or output power spectrum of amplifier 18 is automatically held constant, or a constant current mode in which the drive currents for the pump lasers are automatically held at a constant level.

Figure 3:
FIG. 3 is a graph of an illustrative erbium-doped fiber amplifier gain spectrum when no spectral filtering is used.

The intrinsic gain spectrum of the erbium-doped fiber in gain stages 30 is not flat. An illustrative gain spectrum of an erbium-doped fiber amplifier without a gain flattening filter is shown in FIG. 3. Gain spectra such as the gain spectrum of FIG. 3 are generally unacceptable for optical amplifiers in communications systems, because different channels are amplified by significantly different amounts. This may lead to non-linear optical effects in the fiber when channel powers are too high and may lead to excessive noise when channel powers are too low.

Figure 4:
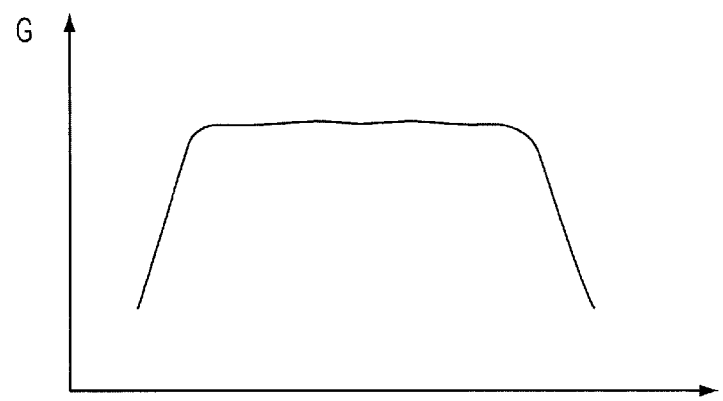
FIG. 4 is a graph showing an illustrative flat gain spectrum that may be produced by an optical amplifier having a dynamic filter in accordance with the present invention.

Amplifier 18 of FIG. 2 may use dynamic filter 44 or a suitable static filter to flatten the erbium gain spectrum. The dynamic filter 44 may include a static filter to reduce the dynamic range requirements of the dynamic portion of filter 44 or may be a completely dynamic filter. Dynamic filter 44 may flatten the erbium gain spectrum by introducing optical loss into the portions of the spectrum in which the erbium gain spectrum is highest. An illustrative gain spectrum for amplifier 18 when dynamic filter 44 is used to flatten the erbium gain spectrum is shown in FIG. 4.

Figure 5:
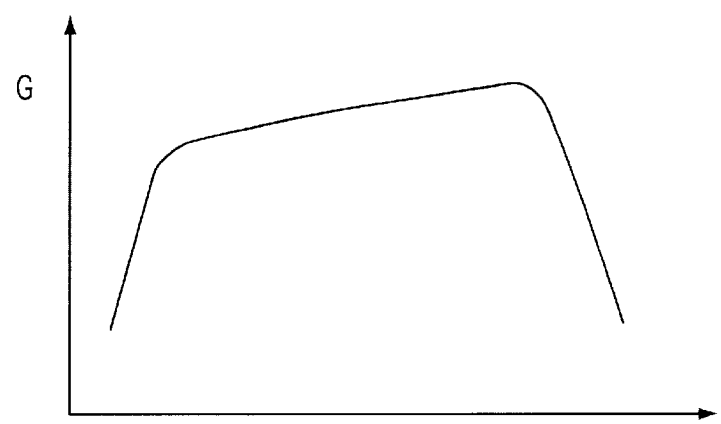
FIG. 5 is a graph showing an illustrative tilted gain spectrum that may be produced by an optical amplifier having a dynamic filter in accordance with the present invention.

If desired, other gain spectra may be produced by amplifier 18 by adjusting the spectrum of filter 44 in real time with control unit 40. As an example, the tilted gain spectrum of FIG. 5 may be produced by introducing a wavelength-dependent loss into the midstage of amplifier 18 using dynamic filter 44. The shape of FIG. 5 is merely illustrative. Filter 44 may be used to produce any suitable spectral shape for amplifier 18 if desired. The spectral shapes that are produced by amplifier 18 may be controlled by the network management system. Information on desired spectral shapes for amplifier 18 may be provided to control unit 40 (FIG. 2) over path 58.

The input power to amplifier 18 may fluctuate suddenly when channels in link 10 are added or dropped suddenly. Channels may be added or dropped due to a system reconfiguration. Channels may be dropped due to a fiber cut or component failure.

Figure 6:
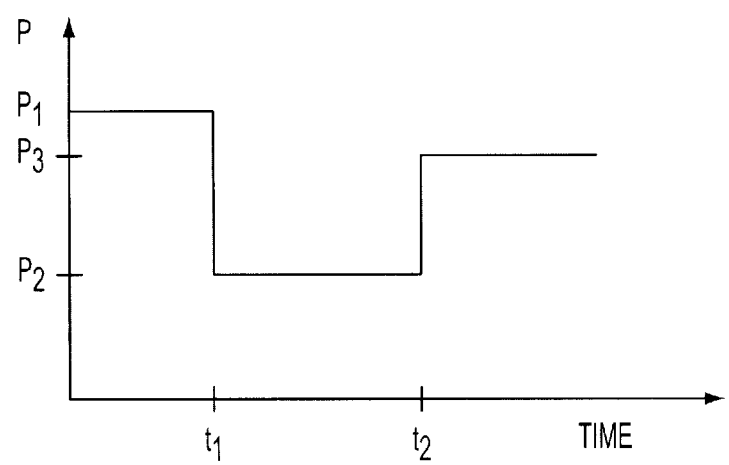
FIG. 6 is a graph showing how the total input power of the optical signals provided to an amplifier may change suddenly when channels are dropped and added.

An input power fluctuation of the type that may be experienced by amplifier 18 is shown in FIG. 6. At times before $t_1$, all channels in link 10 are operating and the total input power provided to input fiber 20 of amplifier 18 is $P_1$. At time $t_1$, some of the channels in link 10 are dropped, which leads to the sudden drop in the input power level to $P_2$. At time $t_2$, channels are added to link 10, which causes a sudden rise in the input power to $P_3$.

Figure 7:
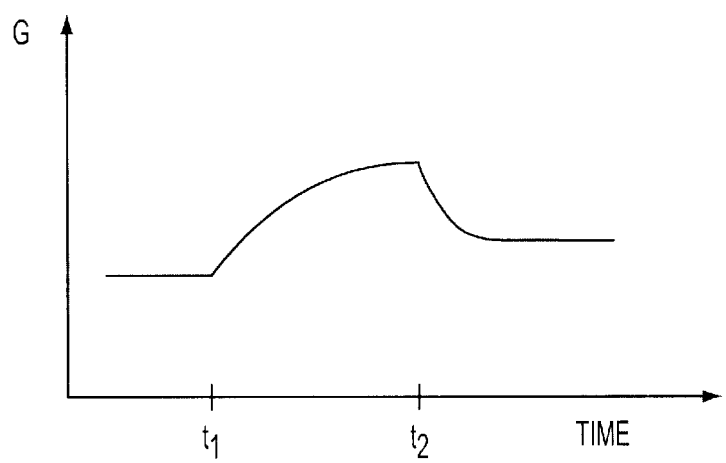
FIG. 7 is a graph showing how the gain in an amplifier without transient control capabilities experiences significant transient effects when the input power to the amplifier fluctuates as shown in FIG. 6.

The changes in the gain of an amplifier without gain transient control capabilities when subjected to input power fluctuations of the type shown in FIG. 6 are shown in FIG. 7. At time $t_1$, the gain rises significantly, due to the sudden reduction in the input power. At time $t_2$, the gain drops significantly, due to the sudden drop in the input power.

Figure 8:
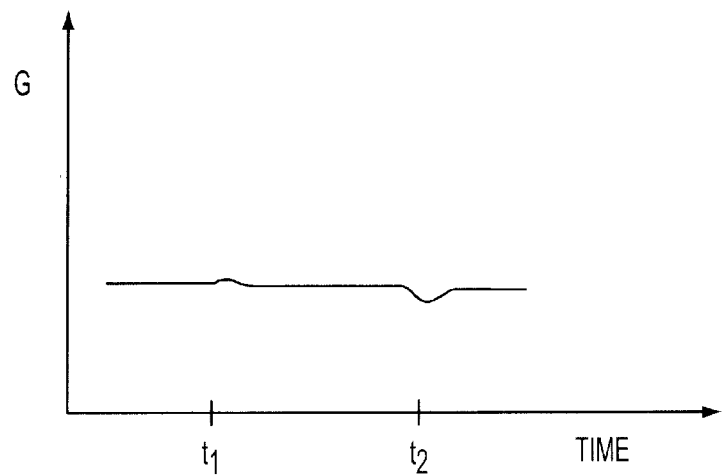
FIG. 8 is a graph showing how gain transients may be suppressed in an amplifier with transient control capabilities in accordance with the present invention.

The response of amplifier 18 to the input power fluctuations of the type shown in FIG. 6 when control unit 40 is used to control gain transients is shown in FIG. 8. Although the input power drops abruptly at time $t_1$, the gain of the amplifier following $t_1$ is relatively fixed at a value of about $G_1$. Similarly, although the input power rises abruptly at time $t_2$, the gain of the amplifier does not vary significantly after $t_2$.

When amplifier 18 is operated in constant gain mode, control unit 40 may prevent gain transients in amplifier 18 by monitoring the signal powers in amplifier 18 using taps such as taps 32 and 34 and monitors such as monitors 52 and 56 and by maintaining the gain of amplifier 18 at the desired level by controlling the power of the pumps in gain stages 30.

With one illustrative approach, control unit 40 may use feedback to control the pumps in gain stages 30. With this approach, control unit 40 may determine the current average gain $G_{CURRENT}$ of amplifier 18 by calculating the ratio of the total output power measured with monitor 56 to the total input power measured with monitor 52. A small time delay may be used to synchronize the input and output power measurements. If the measured average gain $G_{CURRENT}$ is less than the gain set point $G_{DESIRED}$ provided to control unit 40 by the network management system, control unit 40 may increase the pump power of the pumps used in gain stages 30. If the measured average gain is more than the gain set point, control unit 40 may reduce the pump power used in stages 30.

The deviation between the current and desired gain levels may be represented by a gain error parameter E, as set forth in equation 1.

$$E = G_{CURRENT} - G_{DESIRED} \tag{1}$$

In equation 1, $G_{DESIRED}$ is the desired (constant) gain for the amplifier 18 and E is the gain error parameter. The gain error parameter E may be used by control unit 40 to calculate the feedback pump power $P_{PUMP\text{-}FB}$ for the pumps in gain stages 30 to use in optically pumping the erbium-doped fiber in stages 30, as show n in equation 2.

$$P_{PUMP\text{-}FB} = \alpha E + \beta \int E + \gamma E' \tag{2}$$

In equation 2, $\alpha$, $\beta$, and $\gamma$ are fitting parameters that may be determined experimentally. Equation 2 is based on the proportional-integral-derivative (PID) method. This is merely an illustrative feedback control technique that may be used. Any other suitable feedback technique may be used to calculate the pump power if desired.

If desired, control unit 40 may adjust the power of the pumps in gain stages 30 using a feed-forward control technique. With this type of approach, the pump power is adjusted based on the measured input power. When the input power drops suddenly (e.g., when channels in link 10 are dropped), the pump power may be reduced accordingly to avoid over-pumping the erbium-doped fiber. When the input power rises suddenly, (e.g., when channels in link 10 are added), the pump power may be increased to avoid under-pumping the erbium-doped fiber. One suitable relationship that may be used when adjusting the pump power based on input power-measurements is given by equation 3.

$$P_{PUMP\text{-}FF} = a\,P_{IN} + b \tag{3}$$

In equation 3, $P_{PUMP\text{-}FF}$ is the pump power that is used to optically pump the fiber. The input power $P_{IN}$ may be measured using tap 32 and monitor 52. The parameters a and b are fitting constants that may be determined experimentally. A small electronic time delay may be used to accommodate the optical delay time associated with the length of the fiber between tap 32 and the point at which pump light is launched into the fiber. Equation 3 is a linear approximation. If desired, a higher-order approximation or any other suitable function may be used to represent the appropriate pump power for the pumps to produce as a function of measured input power. Moreover, the feed-forward pump power need not be constant. Rather, the pumps may be overdriven for a short-period immediately after a transient is detected to reduce the transient settling time.

With feed-forward pump control approaches such as the approach of equation 3, relatively rapid fluctuations in input power may be almost immediately reflected in changes to the pump power. Feedback approaches such as those described in connection with equations 1 and 2 that are based on maintaining the measured gain of the amplifier at a constant level tend to be slower, because the gain of the amplifier only changes after the inversion level of the erbium-doped fiber changes and affects the output power of the amplifier. Feedback control approaches may, however, be more accurate than feed-forward approaches over longer time scales, because feedback control approaches are relatively insensitive to drift (e.g., drift due to fiber and component aging) and pump calibration variations.

Either a feed-forward technique or a feedback technique may be used individually to control the pumps in gain stages 30. If desired, a hybrid approach may be used in which both feed-forward and feedback pump power values contribute to the total pump power $P_{PUMP}$ that is used to pump the erbium-doped fiber in gain stages 30. With one suitable hybrid approach, the total pump power $P_{PUMP}$ is a linear combination of feedback pump power $P_{PUMP-FB}$ and feed-forward pump power $P_{PUMP-FF}$ contributions, as shown in equation 4.

$$P_{PUMP}=P_{PUMP-FF}+P_{PUMP-FB} \quad (4)$$

The relationship of equation 4 is merely illustrative. The feed-forward and feedback contributions to the pump power for the erbium-doped fiber may be combined using other suitable combining functions if desired.

Figure 9:
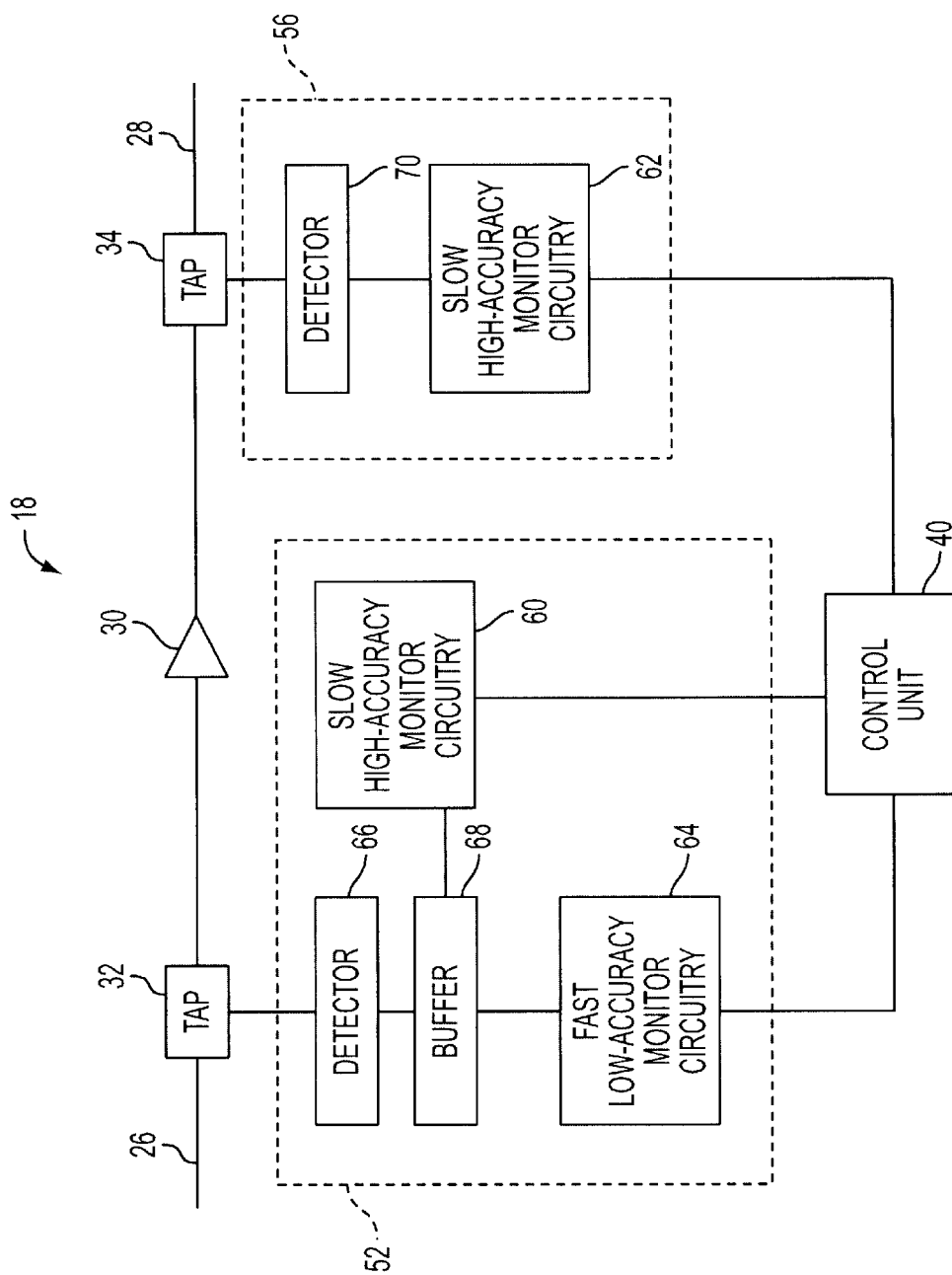
FIG. 9 is a schematic diagram of an illustrative optical amplifier in which different types of monitor circuitry are used to measure tapped optical signals in accordance with the present invention.

As shown in FIG. 9, optical amplifiers 18 may be provided that have both relatively higher accuracy monitor circuitry and relatively lower accuracy monitor circuitry for digitizing tapped optical signal measurements. The higher accuracy monitor circuitry may be relatively slower than the lower accuracy monitor circuitry. In optical amplifiers with hybrid control schemes, the feedback signals tend to change less rapidly than the feed-forward signals. As a result, the feed-forward control path signals tend to require more rapid signal processing capabilities than the feedback control path signals. In this situation, it may be preferable to use such higher-accuracy slower monitor circuitry such as circuitry 60 and 62 in the feedback loop of an optical amplifier transient control system, while using lower-accuracy faster monitor circuitry such as circuitry 64 in the feed-forward control path. At the input of amplifier 18, the high-accuracy slower drive circuitry and the lower-accuracy faster circuitry may digitize the same optical signals. If desired, the higher-accuracy slower monitor circuitry and the lower-accuracy faster monitor circuitry may be provided using common analog-to-digital converter circuitry or other shared circuit arrangements.

Detector 66 may include a photodetector and a transimpedance amplifier that are used to convert tapped optical signals from tap 32 into electrical signals. Buffer circuitry 68 may be used to strengthen the signals from detector 66 that are shared by circuitry 60 and 64.

Detector 70 may include a photodetector and a transimpedance amplifier that convert tapped optical signals from tap 34 into electrical signals for circuitry 62.

Circuitry 60, 62, and 64 may contain analog-to-digital converter circuitry for converting analog electrical signals from detectors 66 and 70 into digital signals for control unit 40. As an example, slow high-accuracy circuits 60 and 62 may include 12 or 14 bit analog-to-digital converters and fast low-accuracy circuit 64 may include a 10 bit analog-to-digital converter. The 12 or 14 bit circuits may be used to make accurate gain measurements for use in a feedback control loop. The 10 bit circuit may be used to support a fast feed-forward control scheme.

Figure 10:
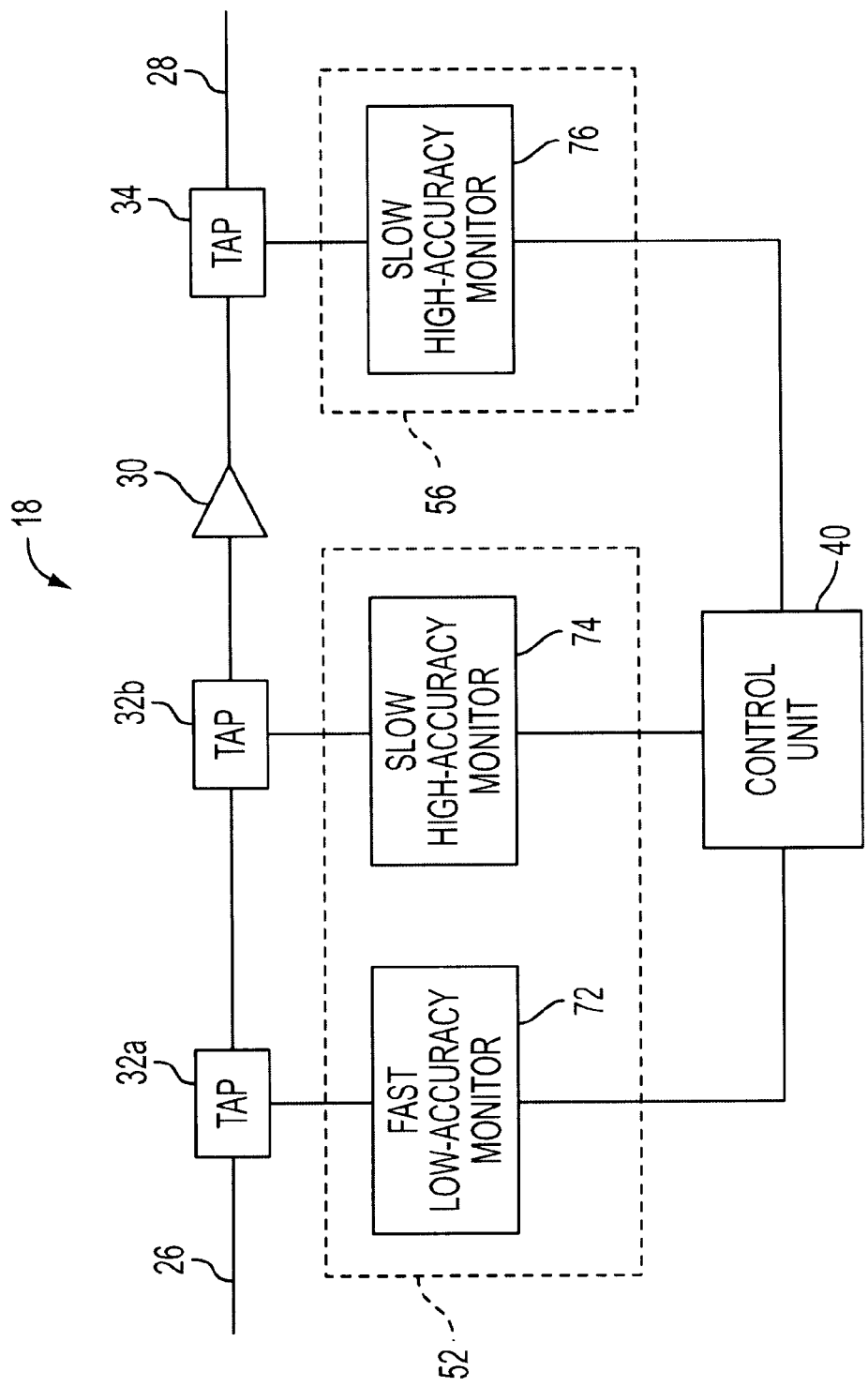
FIG. 10 is a schematic diagram of another illustrative optical amplifier in which different types of monitor circuitry are used to measure tapped optical signals in accordance with the present invention.

Another way in which fast low-accuracy and slow high-accuracy monitor circuits may be used in an optical amplifier is shown in FIG. 10. With the arrangement of FIG. 10, optical input signals may be tapped using two taps—tap 32a and tap 32b—or may be tapped using a single tap and an optical splitter. With this approach, a relatively fast low-accuracy monitor 72 and a relatively slow high-accuracy monitor 74 may be used to convert the optical signals from taps 32a and 32b into digital signals for control unit 40. A slow high-accuracy monitor 76 may be used to convert the optical signals from output tap 34 into digital electrical signals for control unit 40.

Figure 11:
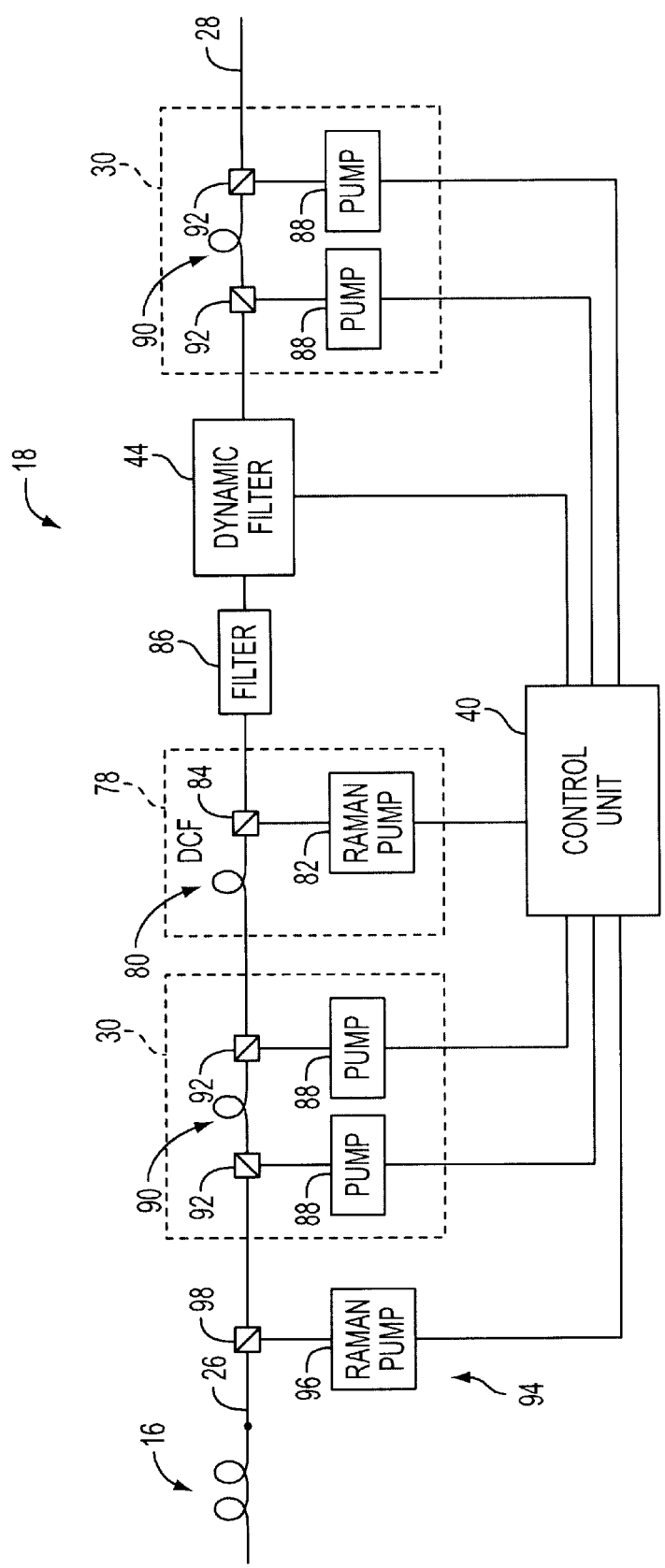
FIG. 11 is a schematic diagram of an illustrative optical amplifier with a dispersion compensation module in accordance with the present invention.

As shown in FIG. 11, amplifier 18 may include one or more dispersion-compensating elements. Any suitable tunable or fixed dispersion compensation elements may be used. As an example, amplifier 18 may include a dispersion compensation module 78 based on one or more coils of dispersion-compensating fiber 80. The dispersion-compensating fiber 80 may be Raman pumped using pump light from Raman pump 82. Raman pump 82 may produce Raman pump light at any suitable wavelength or wavelengths. The wavelengths of light produced by Raman pump 82 may be located about one Stokes shift in wavelength (e.g., 13 THz in frequency) below the signal band carried on link 10 and amplified by amplifier 18. Pump coupler 84 may be used to couple pump light from pump 82 into fiber coil 80.

Static spectral filter 86 (e.g., a fiber Bragg grating or thin-film filter) may be used in series with dynamic filter 44 to reduce the dynamic range requirements for filter 44.

As shown in FIG. 11, each gain stage 30 may include one or more optical pumps 88. Pumps 88 may be based on one or more laser diodes, fiber lasers, or other suitable sources of pump light. Pump couplers 92 such as wavelength-division-multiplexing couplers may be used to couple pump light from pumps 88 into fiber coils 90. Coils 90 may be based on rare-earth-doped fiber such as erbium-doped fiber, may be small core-area fiber or other fiber that produces optical gain through stimulated Raman scattering when pumped by pumps 88, may be other suitable fiber, or may include combinations of such fiber.

Although two gain stages 30 are shown in FIG. 11, amplifier 18 may have one, two, three, or more gain stages. Each gain stage may include one, two, or more pumps 88. In the arrangement of FIG. 11, coils 90 are copumped and counterpumped. If desired, coils such as coils 90 may be only copumped or only counterpumped. Any suitable number of coils 90 may be used.

If desired, amplifier 18 may have a Raman pump module 94. Raman pump light for transmission fiber span 16 may be produced by Raman pump 96. Raman pump 96 may be based on laser diodes or fiber lasers or any other suitable source of Raman pump light. Raman pump light from pump 96 may be coupled into fiber span 16 by pump coupler 98. Pump coupler 98 may be a wavelength-division-multiplexing coupler or any other suitable pump coupler. The Raman pump light from pump 96 may be used to provide Raman gain in transmission fiber span 16 through stimulated Raman scattering. The wavelength or wavelengths of the pump light produced by pump 96 may be located in a wavelength range that is about one Stokes shift (13 THz in frequency) below the signal band. Pump module 94 may be incorporated into amplifier 18 as shown in FIG. 11 or may be provided as a separate pump module or other optical network equipment that is controlled by control unit 40 or another suitable controller.

The amplifier 18 of FIG. 11 is merely illustrative. Any suitable amplifier 18 may be used in link 10 if desired. Additional components such as components 48 of FIG. 2 may be included in amplifier 18 of FIG. 11 and some of the components shown in FIG. 11 may be omitted if desired.

Figure 12:
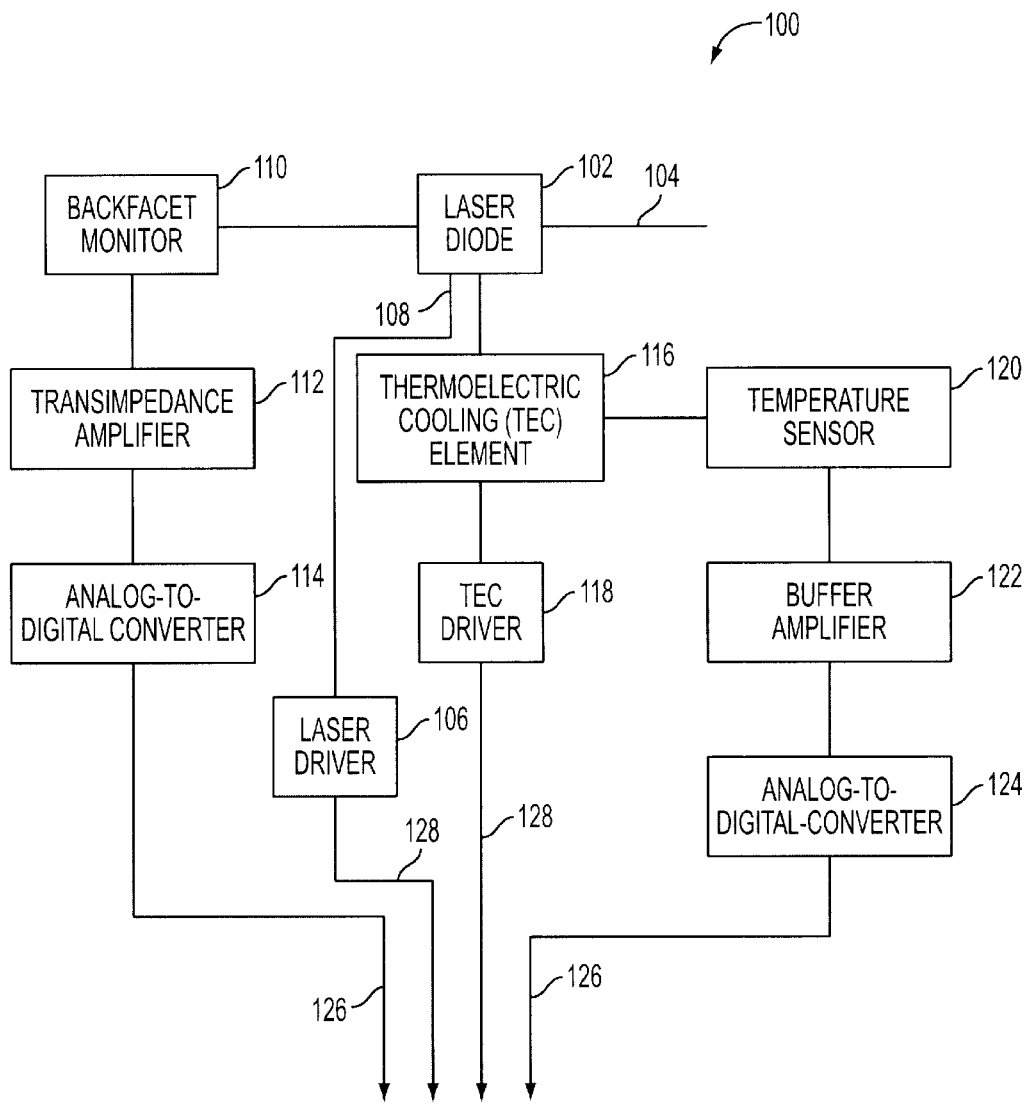
FIG. 12 is a schematic diagram of an illustrative pump arrangement for an optical amplifier or other network equipment in accordance with the present invention.

An illustrative pump that may be used to provide optical pumping in amplifier 18 is shown in FIG. 12. Pump 100 of FIG. 12 may be, for example, one of the pumps 88 for gain stages 30, may be a Raman pump such as pump 82 for pumping dispersion-compensation module 78, may be a Raman pump such as pump 96, or may be used to provide optical pumping in other suitable configurations.

Pump light may be generated by one or more laser diodes such as laser diode 102. The configuration of FIG. 12 is shown as being based on one laser diode to avoid overcomplicating the drawing. The pump light from diode 102 may be provided to a suitable pump coupler such as one of pump couplers 98, 84, or 92 (FIG. 11) over fiber 104. Drive current for laser diode 102 may be provided to laser diode 102 from pump driver 106 over path 108.

Laser diode 102 may have a backfacet monitoring configuration. With this type of arrangement, a fraction of the pump light exiting laser diode 102 is directed to a backfacet monitor 110 through the back facet of laser diode 102. The power of the backfacet light may be proportional to the power of the pump light exiting the laser diode 102 at the output coupled to fiber 104, so backfacet monitor 110 may be used as a power meter for laser diode 102. Transimpedance amplifier 112 may be used to convert current signals from backfacet monitor 110 into voltage signals that may be digitized by analog-to-digital converter 114.

The temperature of laser diode 102 may be regulated using a temperature sensing and control arrangement. Laser diode 102 may be mounted on a temperature controller such as thermoelectric cooling (TEC) element 116. TEC element 116 may be a Peltier effect device. When current is applied to TEC element 116 in one direction by TEC driver 118, TEC element 116 cools laser diode 102. When current is applied to TEC element 116 in the opposite direction by TEC driver 118, TEC element 116 heats laser diode 102.

The current temperature of laser diode 102 and TEC element 116 may be monitored using temperature sensor 120. Temperature sensor 120 may be based on a thermistor, a thermocouple, or any other suitable temperature monitoring device. Temperature sensor 120 may be thermally coupled to laser diode 102 and thermoelectric cooling element 116. A heat sink or other suitable device may be used to thermally couple temperature sensor 120, laser diode 102, and thermoelectric cooling element 116.

An optional buffer amplifier 122 may be used to gather temperature readings from temperature sensor 120. The output of buffer amplifier 122 may be digitized using analog-to-digital converter 124.

Data signals from analog-to-digital converters 124 and 114 (which may be part of the same unit) may be provided to control unit 40 over one or more paths 126 (e.g., using serial digital communications). Signals for controlling thermoelectric cooling element 116 and laser diode 102 may be provided from control unit 40 over one or more paths such as paths 128 (e.g., using parallel digital communications for laser diode 102 and serial digital communications or analog communications for TEC element 116).

Figure 13:
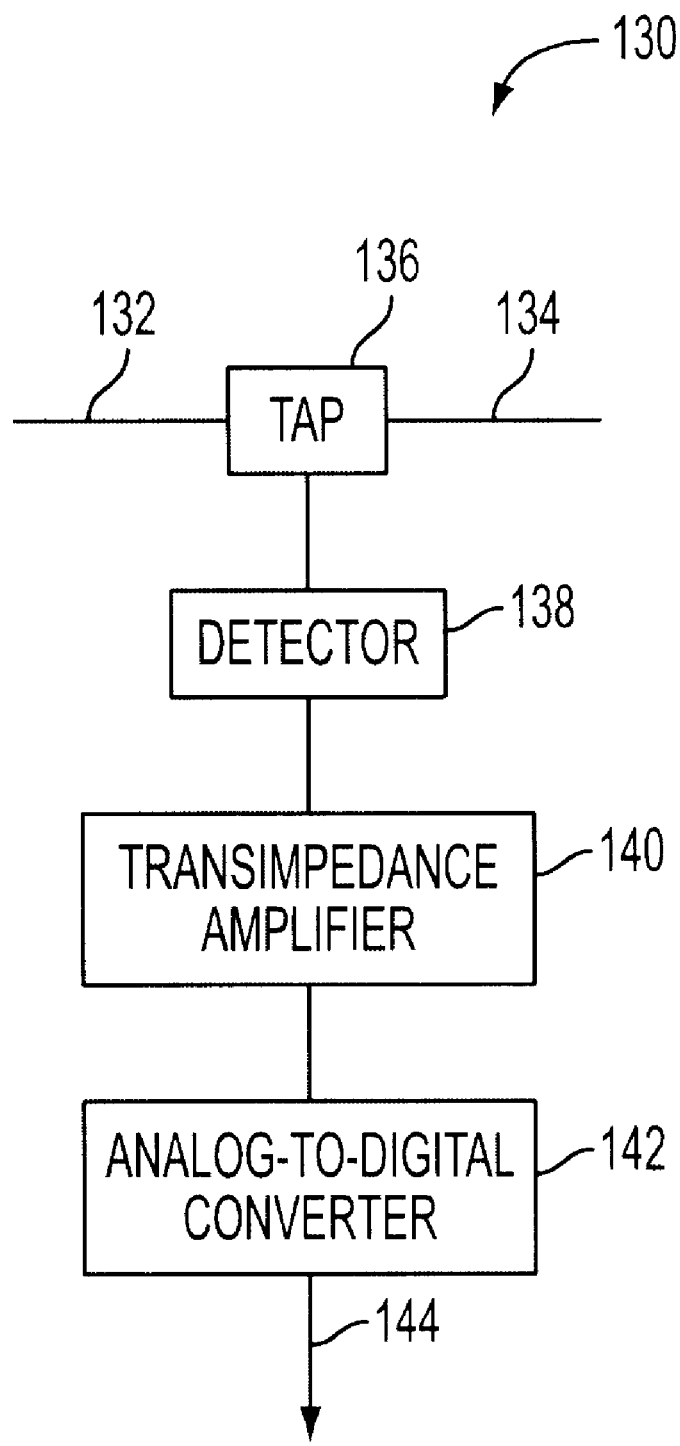
FIG. 13 is a schematic diagram of an illustrative optical signal monitoring arrangement for an optical amplifier or other network equipment in accordance with the present invention.

An illustrative monitor 130 for monitoring optical signals in amplifier 18 is shown in FIG. 13. An optical tap (e.g., a 2% optical tap) may be used to tap optical signals in amplifier 18 that are passing from fiber 132 to fiber 134. Fibers 132 and 134 may be optically coupled at any suitable location in amplifier 18 such as at an input or output tap position at fiber 26 or fiber 28 or elsewhere along the main fiber path through amplifier 18.

Tapped light from tap 136 may be converted into electrical current signals using a photodetector 138. Transimpedance amplifier 140 may be used to convert current signals from detector 138 into voltage signals. The voltage signals from amplifier 140 may be digitized using analog-to-digital converter 142. Power measurements on the tapped optical signals may be provided to control unit 40 as digital information using path 144 (e.g., a parallel digital path such as a parallel time-shared bus).

Figure 14:
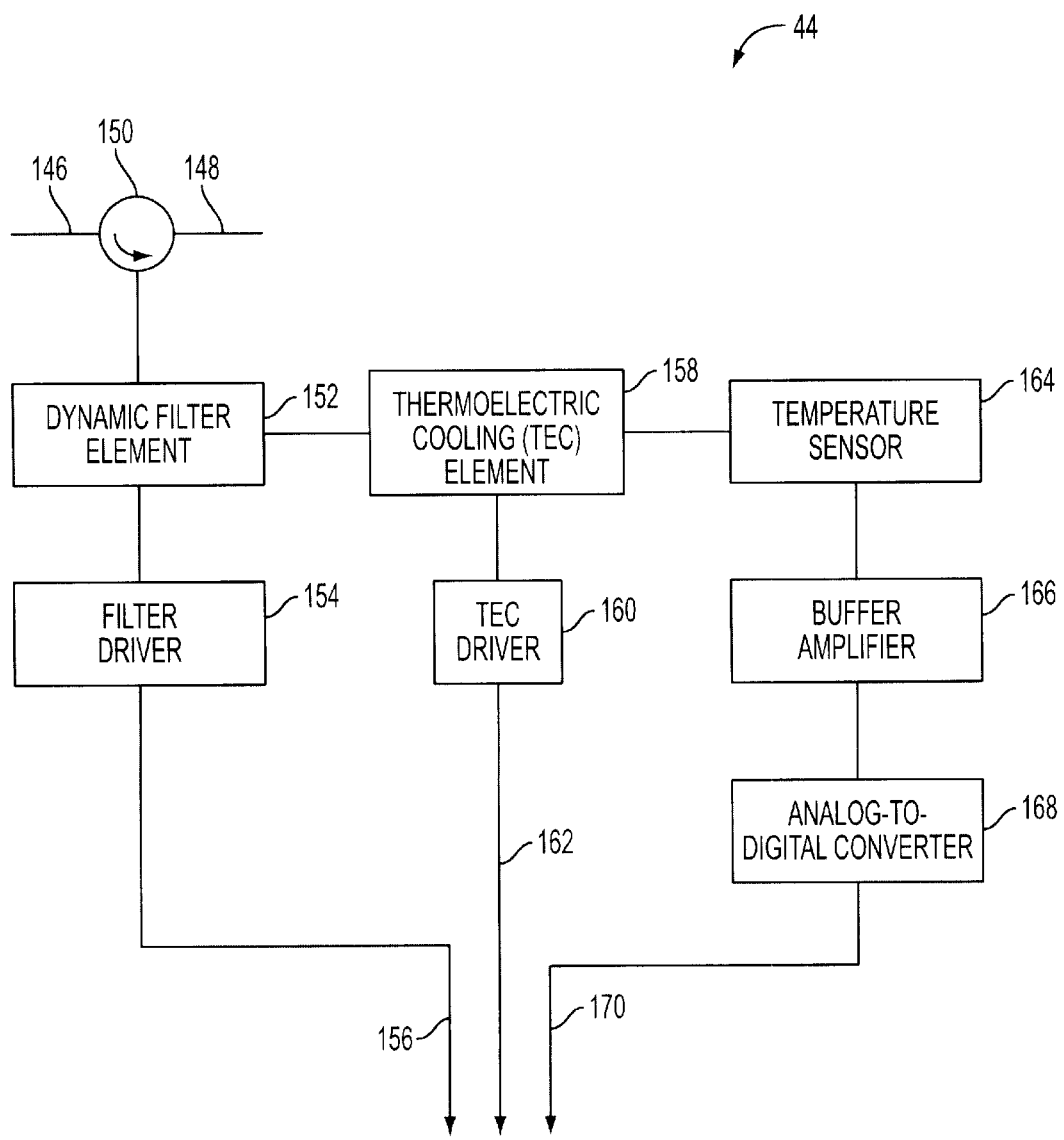
FIG. 14 is a schematic diagram of an illustrative dynamic filter arrangement for an optical amplifier or other network equipment in accordance with the present invention.

An illustrative dynamic filter 44 that may be used to spectrally-modify the light passing through amplifier 18 is shown in FIG. 14. Input light for filter 44 may be provided to fiber input 146. Fiber output 148 may be used to provide corresponding spectrally-filtered output light from filter 44. Input 146 and output 148 may be optically coupled at any suitable location in the fiber path of amplifier 18 between input fiber 26 and output fiber 28 if desired.

Circulator 150 may direct input light from fiber 146 to dynamic filter element 152. Filter element 152 may be based on any suitable dynamic filter element, as described in connection with FIG. 2. The light that is directed to filter element 152 may be reflected and spectrally modified by filter element 152. The spectrally modified light that is reflected from element 152 may be directed to output 148 by circulator 150. In the example of FIG. 14, filter element 152 operates in reflection and a circulator 150 is used to allow filter 44 to operate in transmission. This is merely illustrative. If desired, element 152 may operate in transmission or filter 44 may operate in reflection (e.g., in conjunction with a separate circulator).

The spectrum that is produced by dynamic filter 44 is controlled by controlling the spectrum of element 152. The spectrum that is produced by filter 44 may be a loss spectrum. At wavelengths in which the reflectivity of filter element 152 is high, the loss of filter 44 will be low. At wavelengths in which the reflectivity of filter element 152 is low, the loss of filter 44 will be high. If element 152 is based on an active device such as a Raman-pumped fiber, element 152 and filter 44 may produce gain at some or all of the filter wavelengths.

The spectrum that is produced by dynamic filter element 152 may be controlled using filter driver 154. If dynamic filter element 152 is a MEMS device, the spectrum that is produced by dynamic filter element 152 may be controlled by the AC or DC voltage signals produced at the output of driver 154. Driver 154 may be controlled by control unit 40 using path 156 (e.g., a serial data communications path). Driver 154 or other suitable circuitry coupled to element 152 may be used to monitor the state of filter element 152. Optical channel monitor 38 (FIG. 2) may be integrated with element 152 if desired.

The temperature of dynamic filter element 152 may be regulated using a temperature sensing and control arrangement. Dynamic filter element 152 may be mounted on a temperature controller such as thermoelectric cooling (TEC)

element 158. TEC element 158 may be a Peltier effect device. When current is applied to TEC element 158 in one direction by TEC driver 160, TEC element 158 cools element 152. When current is applied to TEC element 158 in the opposite direction by TEC driver 160, TEC element 158 heats element 152.

The current temperature of dynamic filter element 152 may be monitored using temperature sensor 164. Temperature sensor 164 may be based on a thermistor, a thermocouple, or any other suitable temperature monitoring device. Temperature sensor 164 may be thermally coupled to filter element 152 and thermoelectric cooling element 158. A heat sink or other suitable device may be used to thermally couple temperature sensor 164, element 152, and thermoelectric cooling element 158.

An optional buffer amplifier 166 may gather temperature readings from temperature sensor 164. The output of buffer amplifier 166 may be digitized using analog-to-digital converter 168.

Data signals from analog-to-digital converters such as analog-to-digital converter 168 and from filter driver 154 or other circuitry used to handle the drive signals or other signals associated with the operation of element 152 may be provided to a processor or other appropriate circuitry within control unit 40 over paths such as path 156 and 170. Driver 160 may be controlled based on signals provided from control unit 40 using path 162.

Figure 15:
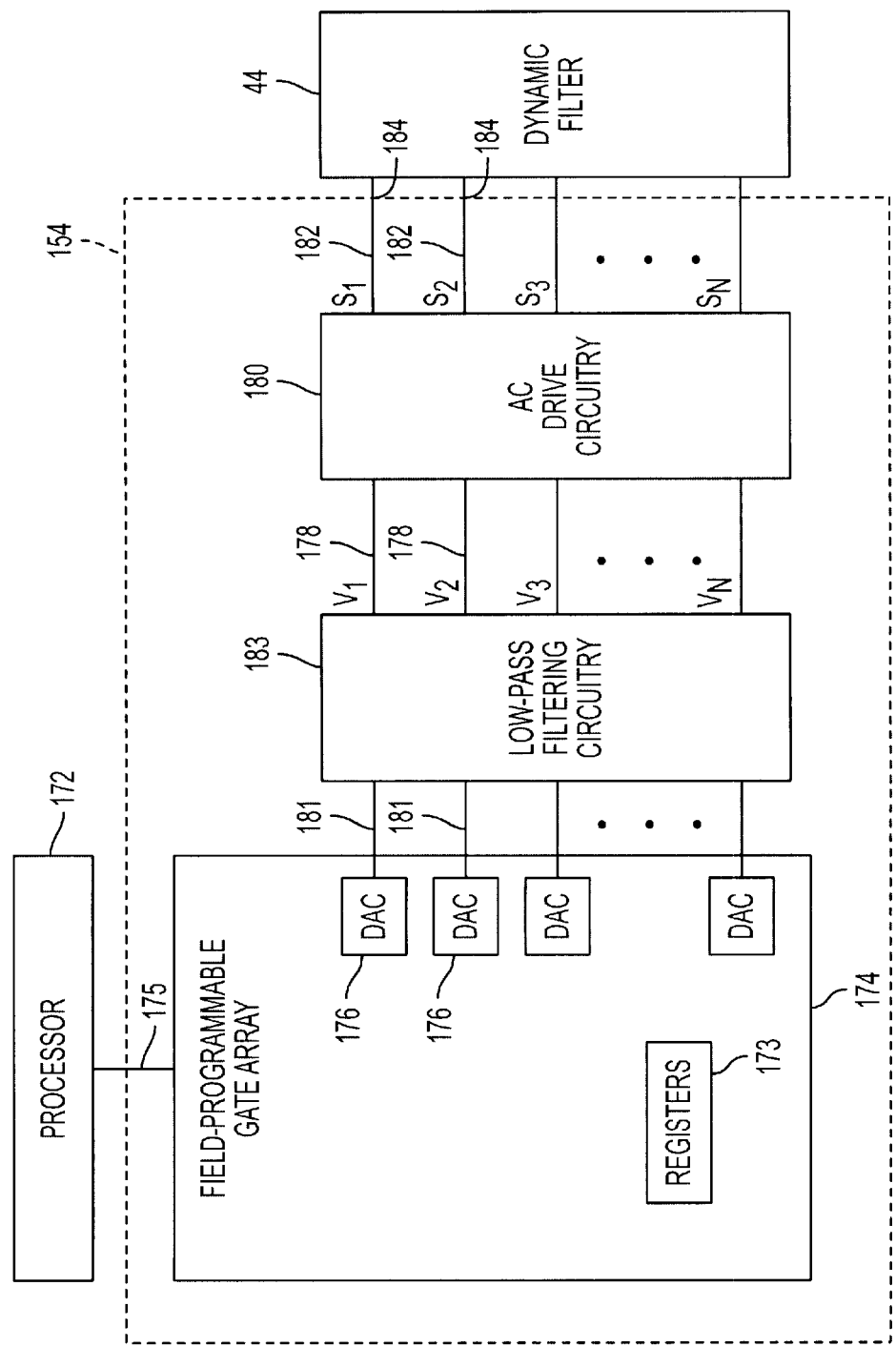
FIG. 15 is a schematic diagram of an illustrative dynamic filter drive circuitry arrangement that may be used in accordance with the present invention.

An illustrative dynamic filter drive arrangement is shown in FIG. 15. Control unit 40 may have a processor 172 (e.g., a microprocessor, microcontroller, digital signal processor, or other suitable processor) or other suitable circuitry (e.g., a programmable logic device) that generates control signals for controlling filter 44. Filter driver 154 may have a field-programmable gate array or other suitable programmable logic device or circuitry 174. The control signals from the processor 172 or other circuitry may be used to control the field-programmable gate array 174 or other device. For example, the control signals from processor 172 maybe used to configure or load registers 173 in field-programmable gate array 174 using paths such as path 175 (e.g., analog or digital control lines, a serial data path, etc.).

Field-programmable gate array 174 may use the control information from processor 172 (e.g., the configuration data from processor 172 that is stored in registers. 173) during operation. Field-programmable gate array 174 may be configured to provide an array of digital-to-analog converter (DAC) elements 176 at some or all of the outputs of array 174. Elements 176 may be used to provide AC output signals on lines 181 that are pulse-width-modulation (PWM) encoded or delta-sigma encoded or encoded using any other suitable scheme. Low-pass filtering circuitry 183 may be used to convert the AC signals on lines 181 into corresponding DC voltages on lines 178. This allows the DAC elements 176 to be used to produce a desired series of DC analog output voltages on lines 178. The voltages produced on lines 178 may be controlled by adjusting the control signals that are provided by processor 172 using path 175. The size of field-programmable gate array 174 and the number of output pins on field-programmable gate array 174 may be selected so that arrays of many DAC elements 176 are supported. For example, tens or hundreds of DAC elements 176 may be provided and after low-pass filtering with circuitry 183 tens or hundreds of corresponding different voltage signals $V_1$, $V_2, \ldots V_N$ may be produced on lines 178. Implementing an array of elements 176 using a field-programmable gate array 174 or other programmable logic device and using low-pass filtering circuitry 183 may be less complex and less costly than using multiple discrete digital-to-analog converters to produce the desired DC voltages.

Driver 154 may include AC drive circuitry 180 that converts the DC voltages $V_1, V_2, \ldots V_N$ that are provided on lines 178 into corresponding AC drive signals $S_1$, $S_2, \ldots S_N$ on lines 182. Any suitable AC drive circuitry 180 may be used to convert DC control signals into AC drive signals. For example, circuitry 180 may be used that produces AC drive signals $S_1, S_2, \ldots S_N$ having magnitudes that are directly proportional to the magnitudes of the corresponding DC voltages $V_1, V_2, \ldots V_N$. The AC drive signals $S_1, S_2, \ldots S_N$ may be used to drive the individual loss or gain elements or channels of dynamic filter 44 (e.g., the various MEMS elements in a MEMS-based filter) using paths 182 coupled to the inputs 184 of dynamic filter 44.

Control unit 40 may control components in amplifier 18 by providing suitable DC or AC analog control signals or digital control signals to the components. Control unit 40 may also gather information from components in amplifier 18 in the form of analog and digital signals. If desired, buses and other signal paths may be used to interconnect the circuitry of control unit 40 and the components in amplifier 18.

The components in amplifier 18 or other optical network equipment that may be controlled by control unit 40 and that may be monitored using control unit 40 include components such as optical gain stages 30 for providing optical gain for the optical signals, variable optical attenuators, dynamic spectral filters 44, add/drop multiplexer components, optical channel monitors 38, dispersion-compensating elements such as module 78, temperature controllers and sensors such as those used to control and measure the temperature of laser diodes 102, dynamic filter element 152, optical channel monitor 38, and other amplifier components such as fiber coils 90 and the photodetectors in the optical monitors, etc., monitors such as monitors 52 and 56, and optical switches.

Figure 16:
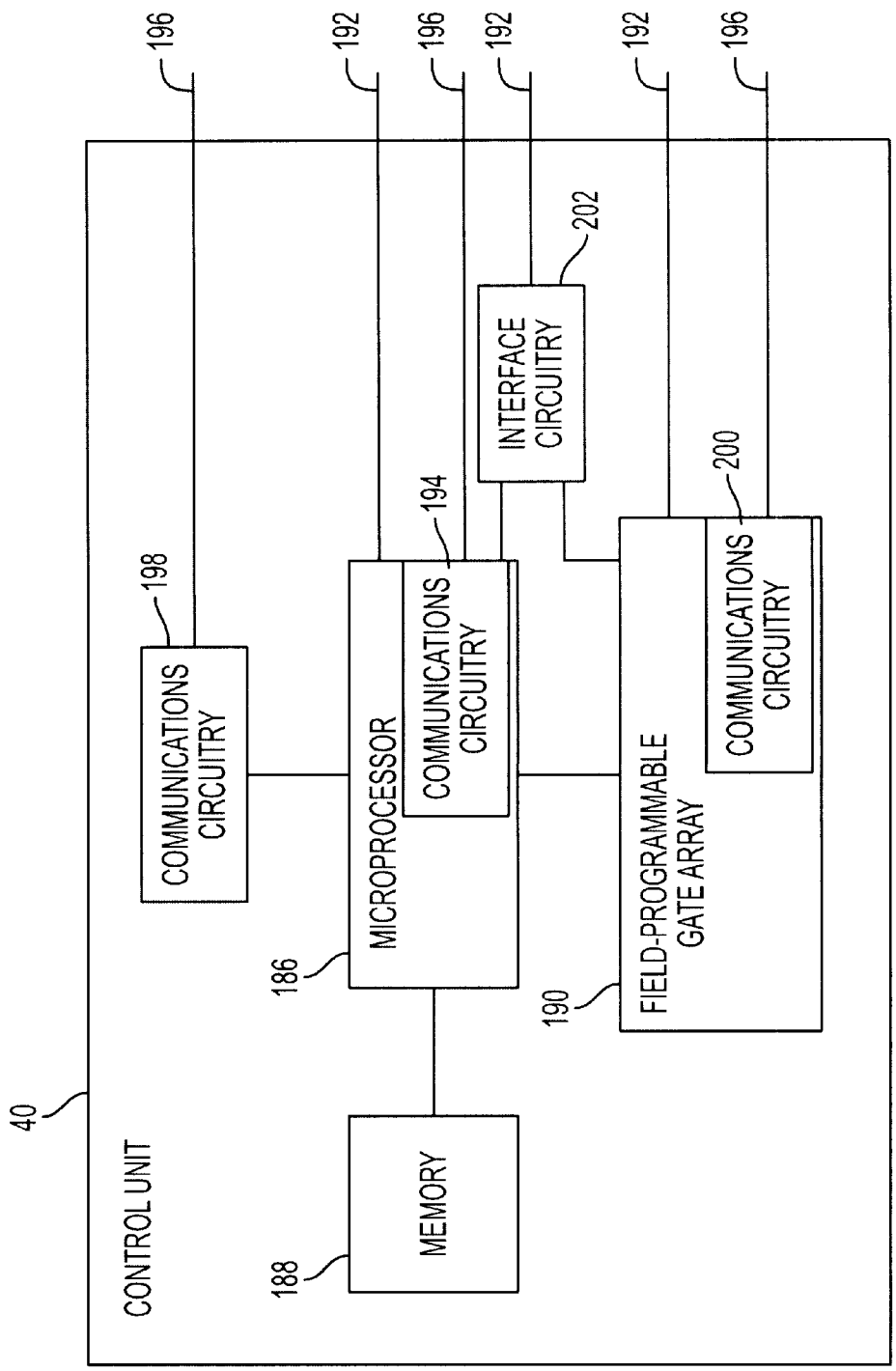
FIG. 16 is a schematic diagram of illustrative circuitry that may be used to support communications between an optical network equipment control unit and components in the equipment in accordance with the present invention.

As shown in FIG. 16, control unit 40 may interface with components in amplifier 18 using paths such as paths 192 and paths 196. Paths 192 may be used to convey suitable DC or AC analog control signals or digital control signals to the components and may be used to gather analog and digital signals from the components. As an example, paths 192 may include analog and digital lines for directly actuating the components and for making direct measurements from the components. Paths 196 may include buses or other paths that support digital communications. Such communications may include serial and parallel communications, point-to-point and multidrop communications, synchronous and asynchronous communications, time-division-multiplexed communications, or any other suitable communications.

Control unit 40 may include one or more processors such as a digital signal processor or microprocessor 186. Processor 186 may execute instructions from memory 188. Memory 188 may also be used to store data and other information. Memory 188 may include volatile and non-volatile memory and storage.

One or more field-programmable gate arrays or other programmable logic devices such as device 190 may be used in control unit 40. These devices may be used to implement functions such as the filter driver functions of FIG. 15, fast control loops, and other suitable functions. Programmable logic devices may be programmed by loading configuration data from memory 188 or using any other suitable programming or configuration technique.

Microprocessor 186 may include circuitry that supports direct interactions with amplifier components over associated paths 192. Interactions between microprocessor 186 or other portions of control unit 40 and the amplifier components may also be supported using circuitry in field-programmable gate array 190 and paths 192. If desired, interactions between microprocessor 186 or other portions of control unit 40 and the amplifier components may be supported using interface circuitry 202 and paths 192. Interface circuitry 202 may be controlled by microprocessor 186 directly or using field-programmable gate array 190.

Communications using paths 196 may be supported using communications circuitry in control unit 40. For example, microprocessor 186 may include communications circuitry 194 that supports communications over paths 196. Communications over paths 196 may also be supported using separate communications circuitry 198 or communications circuitry 200 in a programmable logic device such as field-programmable gate array 190.

Figure 17:
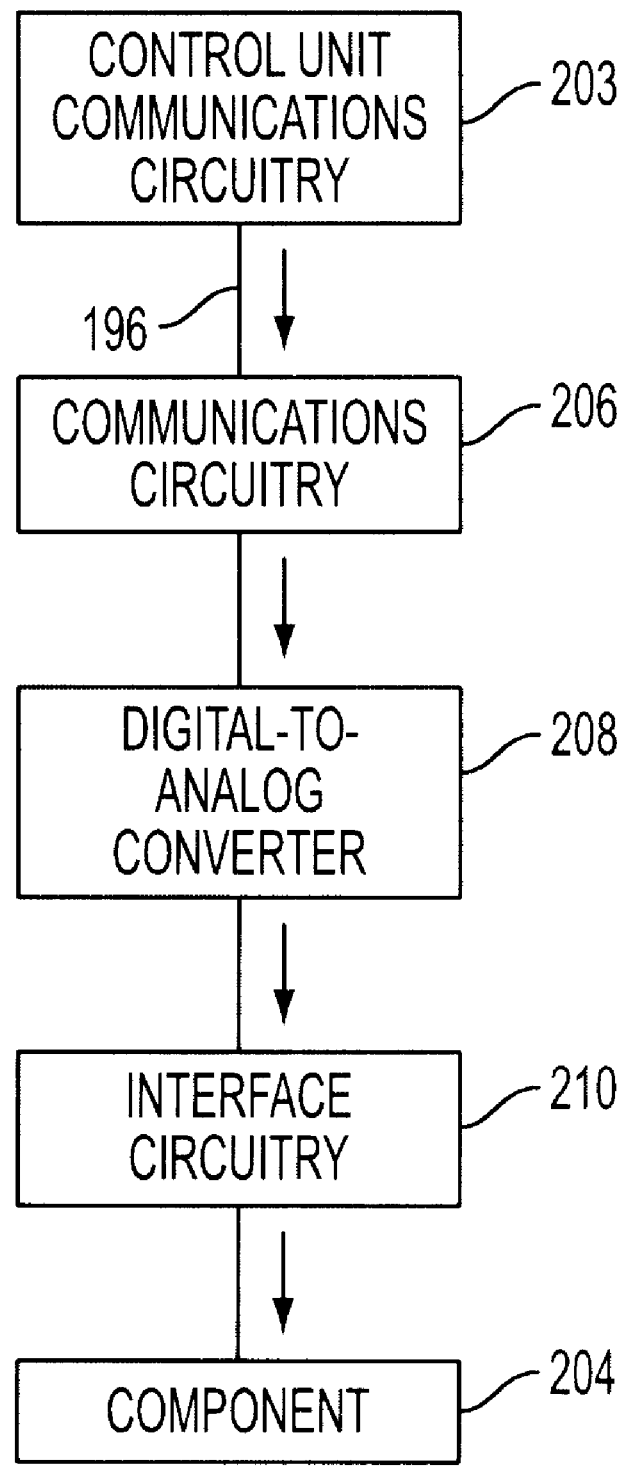
FIG. 17 is a schematic diagram of an illustrative communications configuration that may be used to control components in an optical amplifier or other optical network equipment in accordance with the present invention.
Figure 18:
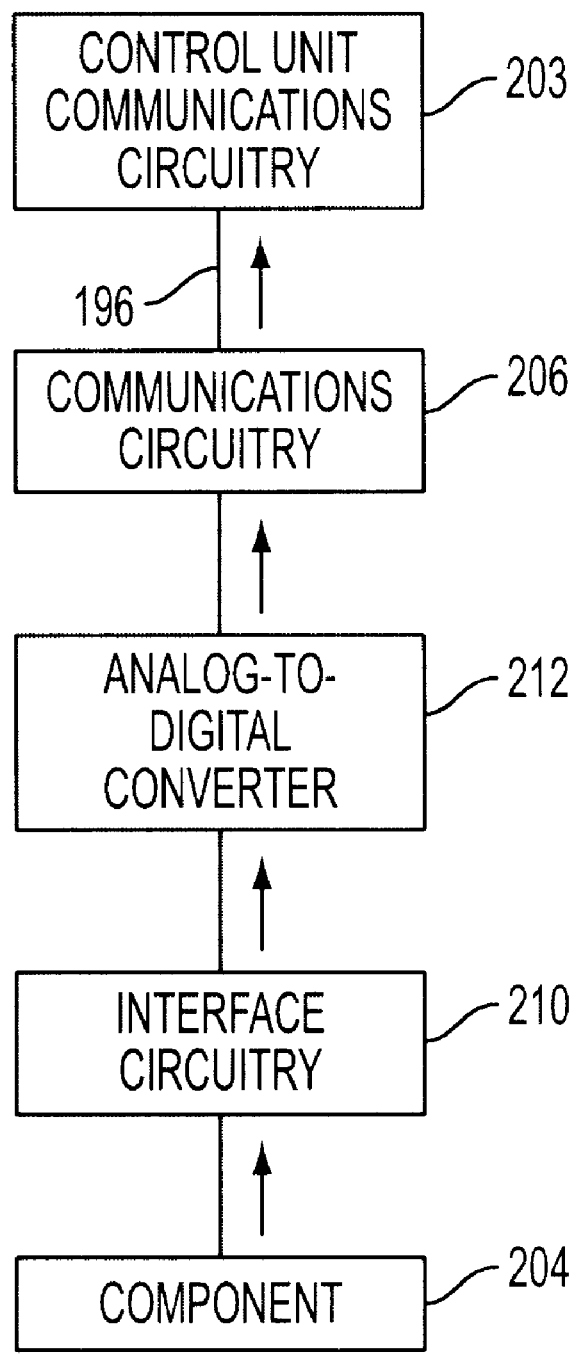
FIG. 18 is a schematic diagram of an illustrative communications configuration that may be used to gather information from components in an optical amplifier or other optical network equipment in accordance with the present invention.

Illustrative arrangements that may be used to support communications between the communications circuitry of control unit 40 and the components of optical amplifier 18 over paths 196 are shown in FIGS. 17 and 18. Communications circuitry 203 of control unit 40 may be based on separate communications circuitry such as communication circuitry 198, may be based on communications circuitry that is provided in a digital signal processor, microprocessor, or other processor such as communications circuitry 194, may be based on communications circuitry that is provided in a programmable logic device such as communications circuitry 200 of field-programmable gate array 190, or may be any other control unit communications circuitry.

Control signals may be provided to the components of amplifier 18 over paths 196 and information may be gathered from the components of amplifier 18 over paths 196. Communications circuitry 203 may be used to provide the control signals to the components and to handle the information from the components.

As shown in FIG. 17, control signals for a component 204 may be provided by control unit communications circuitry 203 over a path 196 that is coupled to communications circuitry 206. Communications circuitry 206 may be associated with component 204 and may be located on the board or other structure in amplifier 18 that is used to mount component 204 at a position that is adjacent to the position at which component 204 is mounted or at any other suitable location. Communications circuitry 206 may process the communications from circuitry 203 and may pass digital signals to digital-to-analog converter circuitry 208 or other suitable control circuitry. Digital-to-analog converter 208 may convert the digital information from communications circuitry 206 into analog control signals that are provided to interface circuitry 210.

Interface circuitry 210 may convert the analog control signals from converter 208 into control signals that are suitable for controlling component 204. As an example, if converter 208 generates a DC analog control voltage and if component 204 requires a drive current, then interface circuitry may contain a current driver that converts the analog control voltage into an appropriate drive current. Interface circuitry 210 may also perform functions such as level shifting, conversion of DC to AC signals, fan-out, interpolation, filtering, conversion of voltage or current into current or voltage, etc.

If desired, some or all of the circuitry of FIG. 17 may be provided using different configurations. For example, some or all of the circuitry of FIG. 17 such as communications circuitry 206, digital-to-analog converter 208, and interface circuitry 210 may be included in component 204. As another example, the functions of communications circuitry 206 and digital-to-analog converter 208 may be combined. These are merely illustrative examples. The circuitry of FIG. 17 may be provided using any suitable configuration.

As shown in FIG. 18, signals from a component 204 such as temperature measurements, electrical measurements, optical measurements light, or other suitable measurements or information may be provided to interface circuitry 210. Interface circuitry 210 may process the signals from component 204 and may provide corresponding processed signals at analog-to-digital converter 212. As an example, interface circuitry 210 may convert analog current measurements into analog voltages. Analog-to-digital converter 212 may be used to convert analog signals from interface circuitry 210 into digital signals. The digital signals from analog-to-digital converter 212 may be provided to communications circuitry 206, which may in turn pass this information to control unit 40 over path 196.

If desired, some or all of the circuitry of FIG. 18 may be provided using different configurations. For example, some or all of the circuitry of FIG. 18 such as communications circuitry 206, analog-to-digital converter 212, and interface circuitry 210 may be included in component 204. As another example, the functions of communications circuitry 206 and analog-to-digital converter 212 may be combined. These are merely illustrative examples. The circuitry of FIG. 18 may be provided using any suitable arrangement.

Moreover, the overall arrangements of FIGS. 17 and 18 are merely illustrative. Any suitable circuitry may be used to provide an electronic interface between communications circuitry 203 and components 204 if desired.

Communications circuitry 203 and 206 and paths 196 may be used to support any suitable communications. For example, RS-232 communications may be supported, $I^2C$™ (two-wire interface or inter-IC interface) communications may be supported, synchronous serial interface (SSI) (sometimes referred to as serial peripheral interface or SPI) communications may be supported, serial and parallel communications may be supported, parallel bus communications may be supported, multidrop serial bus communications may be supported, point-to-point communications may be supported, synchronous and asynchronous communications may be supported, time-division-multiplexing communications may be supported, other suitable communications may be supported, and suitable combinations of such communications may be supported using various paths 196.

Figure 19:
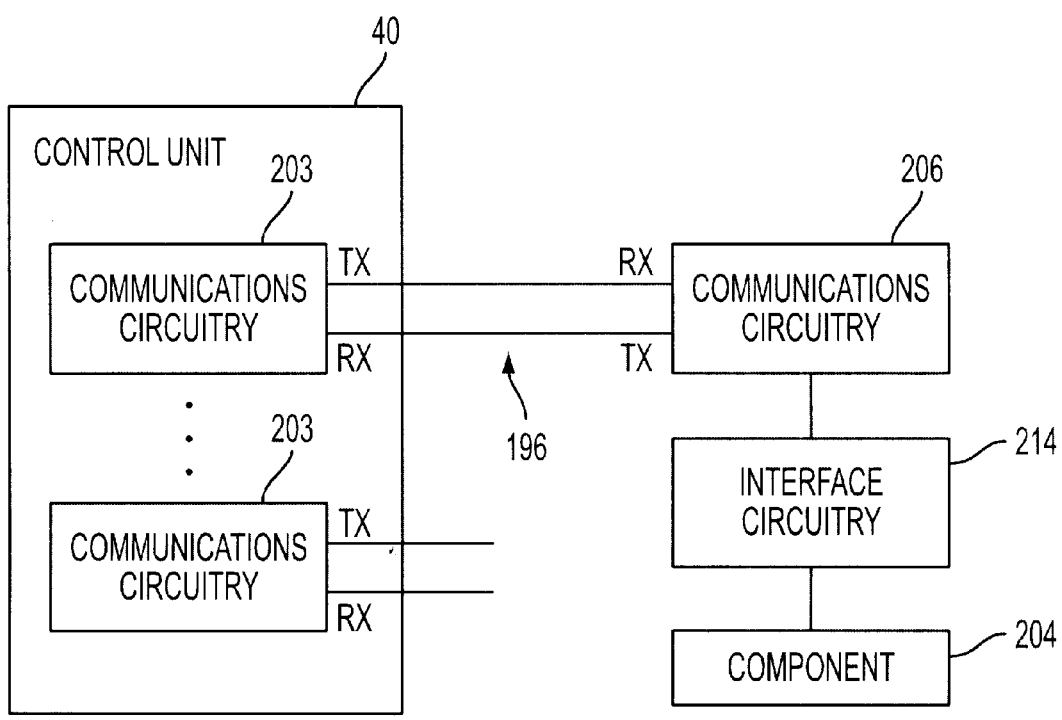
FIG. 19 is a schematic diagram of an illustrative communications arrangement that may be used to support point-to-point communications between a control unit in an optical amplifier or other optical network equipment and a component in the equipment in accordance with the present invention.

An illustrative arrangement in which point-to-point communications between communications circuitry 203 and communications circuitry 206 are used to support one or more point-to-point links over paths such as path 196 is shown in FIG. 19. Interface circuitry 214 may be based on any suitable circuitry for providing an electrical interface between the communications functions of communications circuitry 206 and component 204.

The point-to-point links of FIG. 19 may be asynchronous links such as RS-232 links or other suitable asynchronous links. An advantage of this type of arrangement is that paths 196 may be fairly long and may involve connectors. Moreover, some components 204 may include or be packaged with interface circuitry 214 and RS-232 communications circuitry 206. The functions of communications circuitry 203 may be provided using one or more universal asynchronous receiver/transmitter (UART) blocks. The UART functions may be provided using UART communications ports in microprocessor 186, using UART modules implemented in field-programmable gate array 190, or using separate UART circuitry 198. Components 204 that may use RS-232 communications include dynamic filters 44, optical channel monitors 38, optical switches, dispersion-compensation modules 78 or other dispersion compensators, Raman pump modules such as module 94, or any other suitable components.

Figure 20:
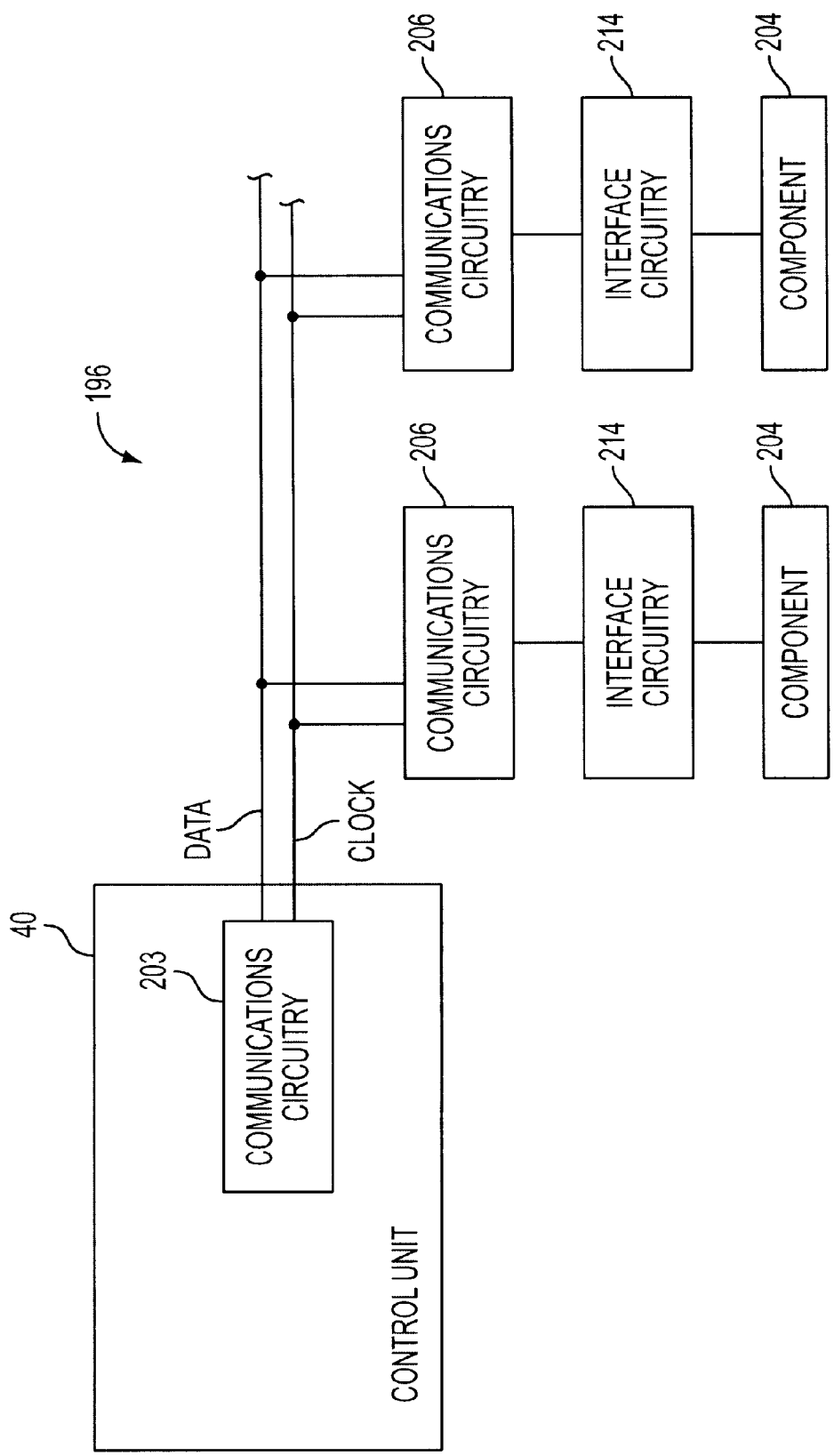
FIG. 20 is a schematic diagram of an illustrative communications arrangement that may be used to support a multi-drop serial communications bus between a control unit in an optical amplifier or other optical network equipment and components in the equipment in accordance with the present invention.

A suitable arrangement in which communications circuitry 203, communications circuitry 206, and path 196 are used to support a multidrop serial bus such as a two-wire interface ($I^2C$) bus is shown in FIG. 20. The bus of FIG. 20 may have a bidirectional clock line and a bidirectional data line for supporting synchronous communications.

Control unit 40 and components 204 may communicate using standard $I^2C$ protocols based on unique addresses or any other suitable communications arrangement. Any suitable number (e.g., one to tens or hundreds) of components 204 may be interconnected with control unit 40 if desired. Components 204 that may be interconnected using the arrangement of FIG. 20 include variable optical attenuators, dynamic filters, optical channel monitors or other optical monitors, temperature controllers and sensors, memory devices such as memory 188 of FIG. 16, switches, dispersion compensators, Raman pump modules or other pumps, gain stages and gain stage components, or any other suitable components 204. The arrangement of FIG. 20 may support significantly faster data communications than the arrangement of FIG. 19, but requires synchronization between communications circuitry 203 and communications circuitry 206.

Figure 21:
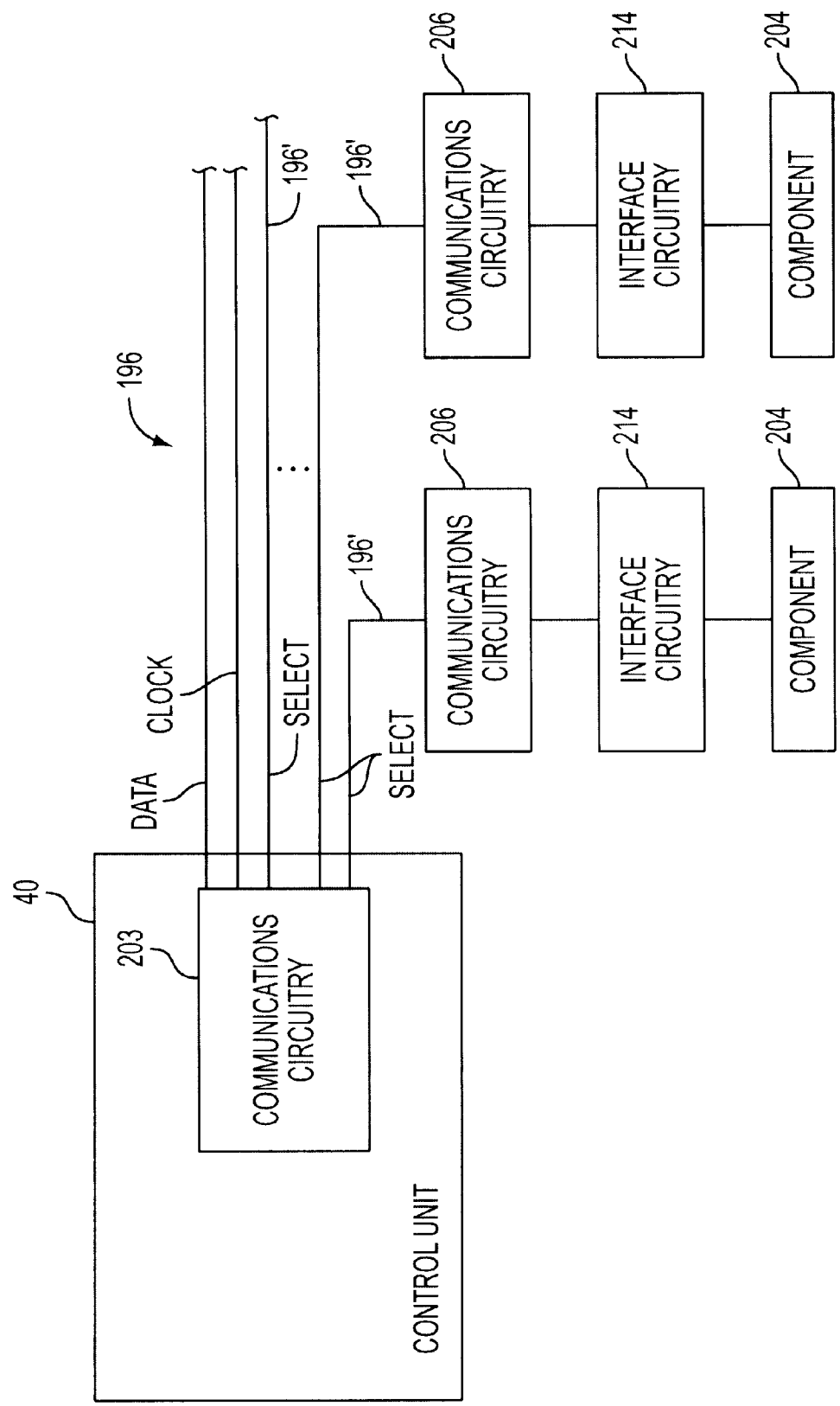
FIG. 21 is a schematic diagram of an illustrative communications arrangement that may be used to support a synchronous serial interface communications bus between a control unit in an optical amplifier or other optical network equipment and components in the equipment in accordance with the present invention.

Another suitable synchronous communications arrangement that may be used to interconnect communications circuitry 203 and communications circuitry 206 is shown in FIG. 21. Arrangements of the type shown in FIG. 21 may use component select lines 196' to specify which component 204 is in communication with communications circuitry 203. The configuration of FIG. 21 may be a synchronous serial interface (SSI) configuration. This type of configuration may require less set-up time and processing overhead than the two-wire interface of FIG. 20, but requires the use of additional lines 196' in path 196.

Components 204 that may be interconnected using the synchronous serial interface approach of FIG. 21 include backfacet monitors such as backfacet monitor 110 of FIG. 12, dynamic filters 44, optical channel monitors 38, optical switches, dispersion-compensation modules 78 or other dispersion compensation devices, Raman pump modules such as module 94 or other pumps, variable optical attenuators, temperature controllers and sensors, memory devices, or any other suitable components 204.

Figure 22:
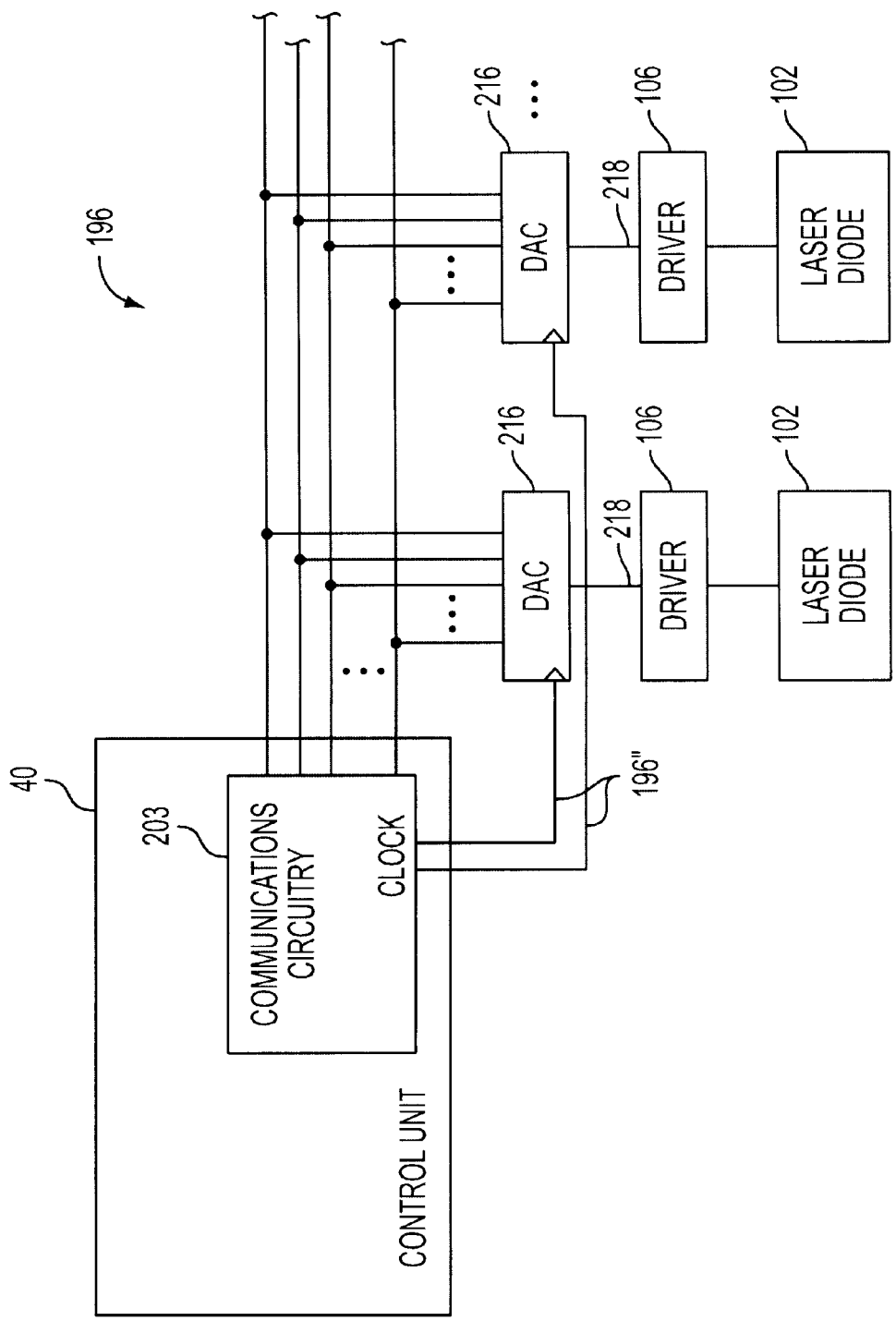
FIG. 22 is a schematic diagram of an illustrative communications arrangement that may be used to support a parallel communications bus between a control unit in an optical amplifier or other optical network equipment and components in the equipment in accordance with the present invention.

A parallel bus arrangement may be used for paths 196. An illustrative arrangement of this type is shown in FIG. 22. In the example of FIG. 22, path 196 is used for controlling components in amplifier 18. This is merely illustrative. This type of arrangement may also be used for gathering information from components in amplifier 18 (e.g., information on measured optical signal powers from monitors such as monitors 52 and 56 of FIG. 2 that is provided to path 196 using arrangements such as the arrangement of FIG. 18).

Communications circuitry 203 may issue digital commands that are provided to digital-to-analog converters 216 or other suitable circuitry over the parallel bus of path 196. Clock lines 196" may be used to distribute clock signals to each of digital-to-analog converters 216. The clock signals may be produced by a clock functional block implemented in a field-programmable gate array or other suitable clock circuit. The clock signals may activate each digital-to-analog converter 216 that is attached to the parallel bus in series, which allows the bus to be time shared in a time-division-multiplexing scheme.

When addressed by an appropriate clock signal, a given digital-to-analog converter 216 converts the digital data provided oh bus 196 into a corresponding analog voltage at its output 218. This voltage may be converted into an appropriate drive current by an associated driver 106. The drive current from the driver 106 may be used to control the laser diode 102 that is connected to that driver.

When the bus arrangement of FIG. 22 is used to read data, analog-to-digital converters such as converter 212 of FIG. 18 or other suitable circuitry may be used to place digital information on the bus.

The parallel bus of FIG. 22 may be 10, 12, or 14 bits wide or may be any other suitable size. This arrangement may be used to allow control unit 40 to control a number of components and to gather data from a number of components in real time with a relatively high accuracy.

Figure 23:
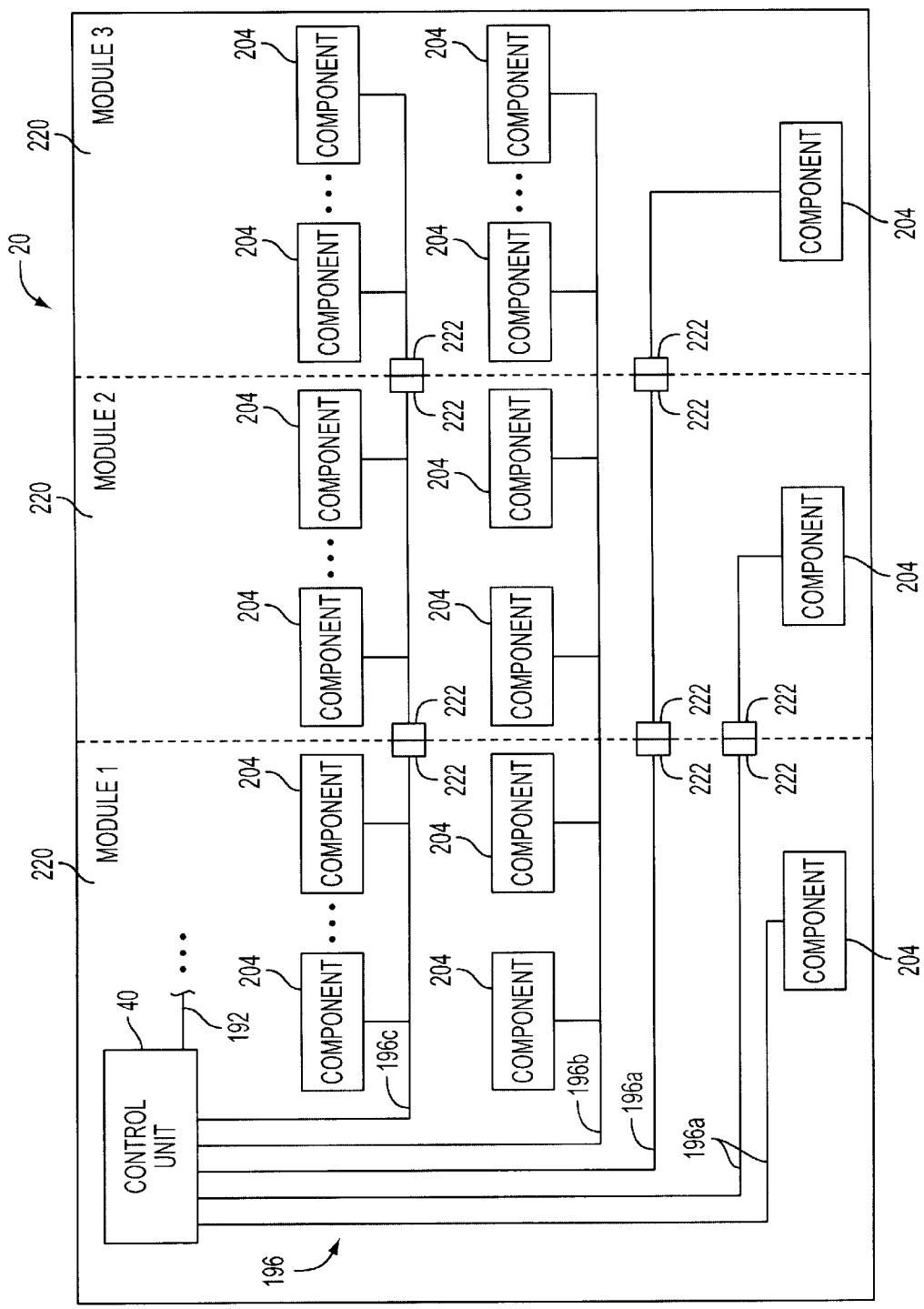
FIG. 23 is a schematic diagram showing how optical network equipment may include multiple modules or portions that are interconnected using buses and other communications paths in accordance with the present invention.

As shown in FIG. 23, an optical amplifier or other optical network equipment 20 may use the paths 192 and 196 of FIGS. 16 and 19–22 to support communications between various components 204 that are part of one or more modules 220. Paths 196a may be RS-232 or other asynchronous point-to-point paths. Path 196b may be a synchronous serial interface path, a two-wire interface ($I^2C$) path, or a parallel bus. Path 196c may be a synchronous serial interface path, a two-wire interface ($I^2C$) path, or a parallel bus. Other suitable serial or parallel bus paths and combinations of such paths or other paths may be used for paths 196 if desired. Path 192 may be part of a series of direct lines or paths between control circuitry in control unit 40 and components 204. If desired, some or all of the paths 196 in FIG. 23 may be omitted.

Connectors such as connectors 222 may be used to connect modules 220. If desired, connectors 222 may be provided at the edge of the boards or other structures on which some or all of the portions of each module 220 are mounted. If desired, the connectors 222 and associated portions of the paths 196 on each board may be located at the same positions (e.g., the same vertical positions in FIG. 23) so that the boards for different modules 220 may be readily interconnected. As additional modules 220 are used, the connectors 222 may be used to electrically interconnect the paths 196 on each module 220. When additional modules 220 are not used, the connectors 222 may remain unused and unconnected to any new module circuitry.

If desired, the modular arrangement of FIG. 23 may be used to lay out integrated single-board or multiboard equipment 20. With this approach, the modular designs may be combined using layout tools in the design phase and fabricated as a single piece of equipment 20. Separate board-based modules need not be attached using connectors during equipment assembly.

Buses and other paths 196 may include multidrop serial bus paths, synchronous serial interface paths, time-division-multiplexed parallel paths, and other suitable buses (e.g., Ethernet buses, PCI buses, etc.) and suitable point-to-point paths such as RS-232 paths. Regardless of whether connectors 222 are used, whether standard connector or bus locations are used, or whether separate module boards 220 or an integrated board or set of boards are used, the use of an extensible architecture based on paths 196 allows equipment 20 to be readily modified or extended by using additional components 204 or different components 204 when it is desired to provide new features.

As an example, module 1 of FIG. 23 may include the optical gain and control portions of an optical amplifier 18 without a dynamic filter 44. Module 2 may include a dynamic spectral filter 44. The filter 44 may be connected to module 1 using any of paths 192 or 196. Module 3 may include an optical channel monitor 38. The optical channel monitor 38 may be interconnected with control unit 40 using appropriate paths 196 (e.g., paths 196 that cross module 2). When it is desired to modify or extend the capabilities of a given type of equipment 20, additional or different components 204 may be readily interconnected with control unit 40 using appropriate paths 192 and 196. In the arrangement of FIG. 23 and other optical network equipment arrangements, power and ground signals may also be distributed among each of the components 204 and modules 220.

The operation of a given amplifier 18 may be controlled using software. Instructions for controlling the operation of the amplifier 18 may be stored in memory such as memory 188 of FIG. 16. Operating system functions and/or application code (herein sometimes collectively referred to as a "control application") may be used to control the operation of the amplifier 18. Each new component 204 or type of component 204 that is used in the amplifier 18 may require additional code. If desired, the code in the control application may be modularized and different portions of the code assembled into a particular control application when needed to operate a given amplifier.

Figure 24:
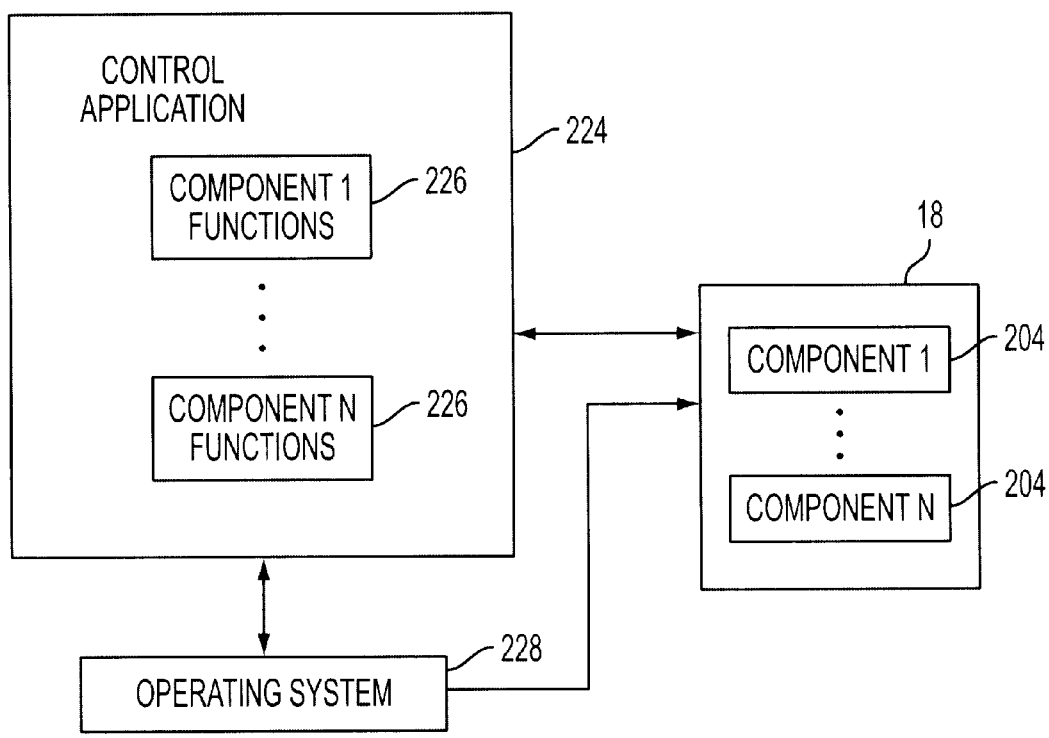
FIG. 24 is a schematic diagram of an illustrative control application arrangement that may be used to control optical network equipment in having multiple components accordance with the present invention.

As shown in FIG. 24, for example, a control application 224 may be modularized so that the functions associated with respective amplifier components 1 . . . N are each provided by a different portion or module 226 of the application. As an example, one module 226 may include drivers for a certain type of dynamic filter 44, whereas another module 226 may include the code or functions needed to operate a given optical channel monitor or pump module. Modules 226 and operating system 228 may be assembled and loaded into amplifiers 18 that have corresponding components 204.

If desired, different sets or groups of components 204 and modules 226 may be associated with different modules 220. An amplifier 18 with given desired set of capabilities may be provided by creating a control application from appropriate modules 226 and amplifier hardware made up of appropriate modules 220 or components 204 or sets of components 204. Control unit 40 may be configured to run control application 224 and operating system 228 during operation of amplifier 18.

Figure 25:
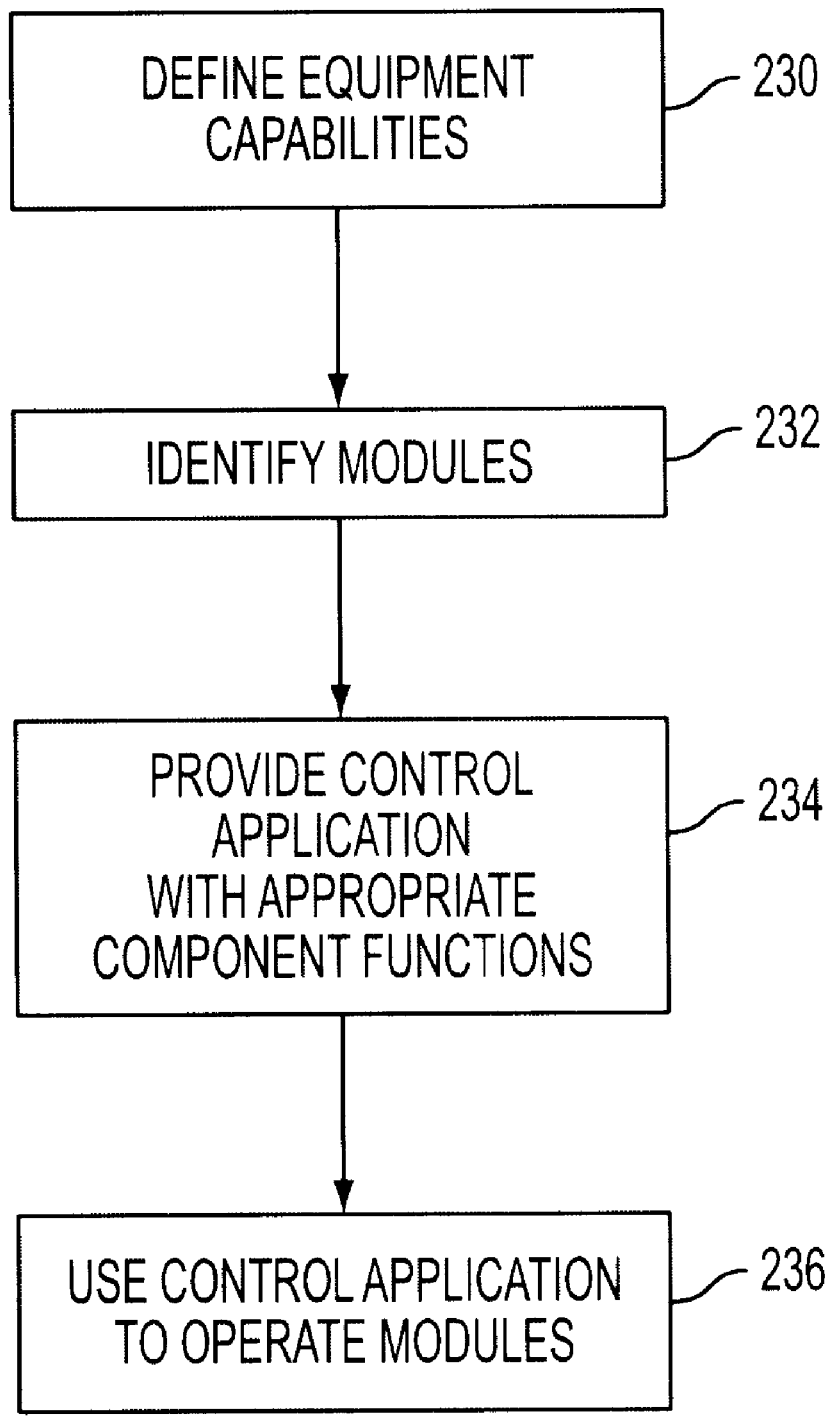
FIG. 25 is a flow chart of illustrative steps involved in using a control application that controls optical network equipment that has multiple components in accordance with the present invention.

A flow chart of illustrative steps involved in using a modular approach to create an optical amplifier 18 or other optical network equipment 20 having desired capabilities is shown in FIG. 25. At step 230, a user may be provided with an opportunity to define the desired capabilities of the equipment. For example, a web-based software package or other suitable arrangement may be used to provide the user with menu options that the user may use to select the desired capabilities of the equipment. A manual approach may also be used. The user may be personnel at the equipment manufacturer, a customer, or any other suitable personnel.

At step 232, the web-based software application or other suitable automatic or manual arrangement may be used to identify which software such as which modules 226 and which hardware such as which components 204 or modules 220 are to be used in the equipment 20 to provide the capabilities defined in step 230.

At step 234, control application 224 may be provided with the appropriate modules 226 identified at step 232. The control application 224 may be assembled prior to loading the control application into equipment 20 during manufacturing, may be assembled in the equipment in the field, or may be assembled using any other suitable approach.

At step 236, the assembled control application 224 may be used to operate equipment 20. Control unit 40 may be configured to run the assembled application 224 during equipment operation.

Although some of the features of the present invention have been described in the context of optical amplifiers 18. This is merely illustrative. The features of the present invention may be used in any suitable optical network equipment 20 if desired.

It will be understood that the foregoing is merely illustrative of the principles of this invention, and that various modifications can be made by those skilled in the art without departing from the scope and spirit of the invention.

What is claimed is:

1. An optical amplifier for use in amplifying optical signals carried on a fiber-optic communications link, comprising:

at least one optical gain stage that amplifies the optical signals, wherein the optical gain stage includes fiber;

a plurality of pump lasers that provide light to optically pump the fiber at respective pump powers;

a plurality of laser drivers, each of which drives an associated pump laser at a respective current;

a plurality of digital-to-analog converters, each of which provides a corresponding analog control voltage to a respective one of the laser drivers;

a parallel digital bus to which each of the digital-to-analog converters is connected to receive digital data that directs that digital-to-analog converter to produce its corresponding analog control voltage; and a control unit that provides the digital data to the digital-to-analog converters using the parallel digital bus, wherein the digital-to-analog converters share the bus using time division multiplexing.

2. The optical amplifier defined in claim 1 wherein the control unit is configured to provide clock signals that activate the digital-to-analog converters in series.

3. The optical amplifier defined in claim 1 further comprising optical monitors that monitor the optical signals in the optical amplifier, wherein the optical monitors are electrically coupled to the parallel digital bus.

4. The optical amplifier defined in claim 1 further comprising a dynamic spectral filter that spectrally filters the optical signals in response to control signals from the control unit.

5. The optical amplifier defined in claim 1 further comprising:

a serial communications path; and a dynamic spectral filter that spectrally filters the optical signals in response to control signals from the control unit that are provided to the dynamic spectral filter using the serial communications path.

6. The optical amplifier defined in claim 1 further comprising:

a multidrop serial bus; and a dynamic spectral filter that spectrally filters the optical signals in response to control signals from the control unit that are provided to the dynamic spectral filter using the multidrop serial bus.

7. The optical amplifier defined in claim 1 further comprising:

a synchronous serial interface bus; and a plurality of temperature sensors that communicate with the control unit using the synchronous serial interface bus.

8. The optical amplifier defined in claim 1 further comprising:
- a serial bus; and
- a plurality of backfacet monitors, each of which is coupled to a respective one of the lasers to monitor laser power, wherein the plurality of backfacet monitors communicate with the control unit using the serial bus.

9. The optical amplifier defined in claim 1 further comprising:
- a synchronous serial interface bus; and
- a plurality of backfacet monitors, each of which is coupled to a respective one of the lasers to monitor laser power, wherein the plurality of backfacet monitors communicate with the control unit using the synchronous serial interface bus.

10. The optical amplifier defined in claim 1 further comprising:
- at least one bus that supports serial bus communications;
- a plurality of temperature sensors; and
- a plurality of backfacet monitors, each of which is coupled to a respective one of the lasers to monitor laser power, wherein the plurality of backfacet monitors communicate with the control unit using serial bus communications and wherein the plurality of temperature sensors communicate with the control unit using serial bus communications.

* * * * *